United States Patent
Takai

(10) Patent No.: US 12,118,070 B2
(45) Date of Patent: Oct. 15, 2024

(54) ACCESS MANAGEMENT SYSTEM, AUTHENTICATION DEVICE FOR ACCESS MANAGEMENT SYSTEM, MANAGEMENT DEVICE FOR ACCESS MANAGEMENT SYSTEM, PORTABLE TERMINAL FOR ACCESS MANAGEMENT SYSTEM, MOBILE BODY FOR ACCESS MANAGEMENT SYSTEM, DATA STRUCTURE FOR ACCESS MANAGEMENT DATA, ACCESS MANAGEMENT PROGRAM, AND CONSTRUCTION METHOD FOR ACCESS MANAGEMENT SYSTEM

(71) Applicant: Mitsubishi Electric Corporation, Tokyo (JP)

(72) Inventor: Manato Takai, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 518 days.

(21) Appl. No.: 17/428,977

(22) PCT Filed: Apr. 9, 2020

(86) PCT No.: PCT/JP2020/016034
§ 371 (c)(1),
(2) Date: Aug. 6, 2021

(87) PCT Pub. No.: WO2020/213516
PCT Pub. Date: Oct. 22, 2020

(65) Prior Publication Data
US 2022/0027448 A1    Jan. 27, 2022

(30) Foreign Application Priority Data
Apr. 18, 2019  (WO) .................. PCT/JP2019/016637

(51) Int. Cl.
*G06F 21/35* (2013.01)
*G06F 21/44* (2013.01)
(Continued)

(52) U.S. Cl.
CPC .............. *G06F 21/35* (2013.01); *G06F 21/44* (2013.01); *G06F 21/602* (2013.01);
(Continued)

(58) Field of Classification Search
None
See application file for complete search history.

(56) References Cited

U.S. PATENT DOCUMENTS

2018/0254905 A1    9/2018  Chun
2018/0342036 A1*  11/2018  Zachary .................. H04W 4/44
(Continued)

FOREIGN PATENT DOCUMENTS

JP    2013-91964 A    5/2013
JP    2018-516030 A   6/2018
(Continued)

OTHER PUBLICATIONS

International Search Report and Written Opinion mailed on Jun. 30, 2020, received for PCT Application PCT/JP2020/016034, Filed on Apr. 9, 2020, 10 pages including English Translation.

*Primary Examiner* — Bassam A Noaman
(74) *Attorney, Agent, or Firm* — XSENSUS LLP

(57) ABSTRACT

An access management system that reduces possibility of unauthorized access, an authentication device, a management device, a portable terminal, and a mobile body configuring the access management system, a data structure for access management data used in the access management system, an access management program executed in the access management system, and a construction method for the access management system. A plurality of nodes con-
(Continued)

nected by a P2P network share a blockchain. Authentication conditions are recorded in blocks of the blockchain by a management node, which is any one of the plurality of nodes. The authentication conditions include authentication information. The authentication conditions designate an authentication node, which is any one of the plurality of nodes, as a node that performs authentication. The passing body is authenticated by the authentication node.

21 Claims, 8 Drawing Sheets

(51) Int. Cl.
*G06F 21/60* (2013.01)
*G07C 9/00* (2020.01)
*H04L 9/32* (2006.01)
*H04L 9/00* (2022.01)

(52) U.S. Cl.
CPC ....... *G06F 21/604* (2013.01); *G07C 9/00182* (2013.01); *H04L 9/3234* (2013.01); *G07C 2009/0019* (2013.01); *H04L 9/50* (2022.05)

(56) References Cited

U.S. PATENT DOCUMENTS

| | | | |
|---|---|---|---|
| 2019/0080538 A1* | 3/2019 | Shahidi | H04W 4/33 |
| 2020/0103930 A1* | 4/2020 | Suresh | G06F 1/06 |
| 2020/0344076 A1* | 10/2020 | Brittan | H04L 63/0838 |
| 2020/0364647 A1* | 11/2020 | Degen | G06Q 10/08 |
| 2020/0367060 A1* | 11/2020 | Krishnamoorthy | H04L 63/123 |
| 2021/0012278 A1* | 1/2021 | Alon | G06Q 10/087 |
| 2021/0097795 A1* | 4/2021 | Manchovski | H04L 63/108 |

FOREIGN PATENT DOCUMENTS

| | | |
|---|---|---|
| JP | 6601828 B2 | 11/2019 |
| JP | 6756817 B2 | 9/2020 |
| WO | 2016/164496 A1 | 10/2016 |
| WO | 2016/179334 A1 | 11/2016 |

* cited by examiner

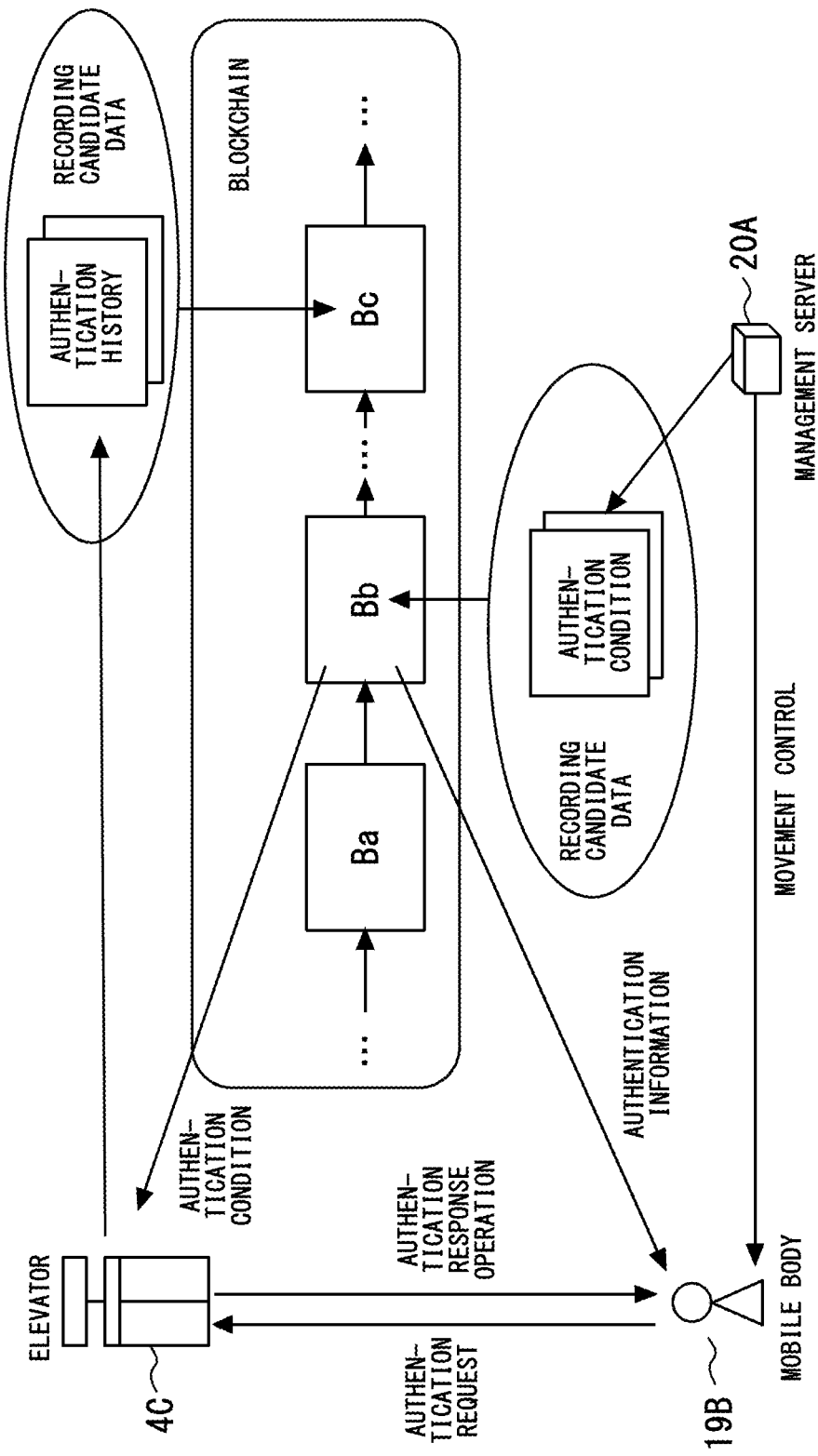

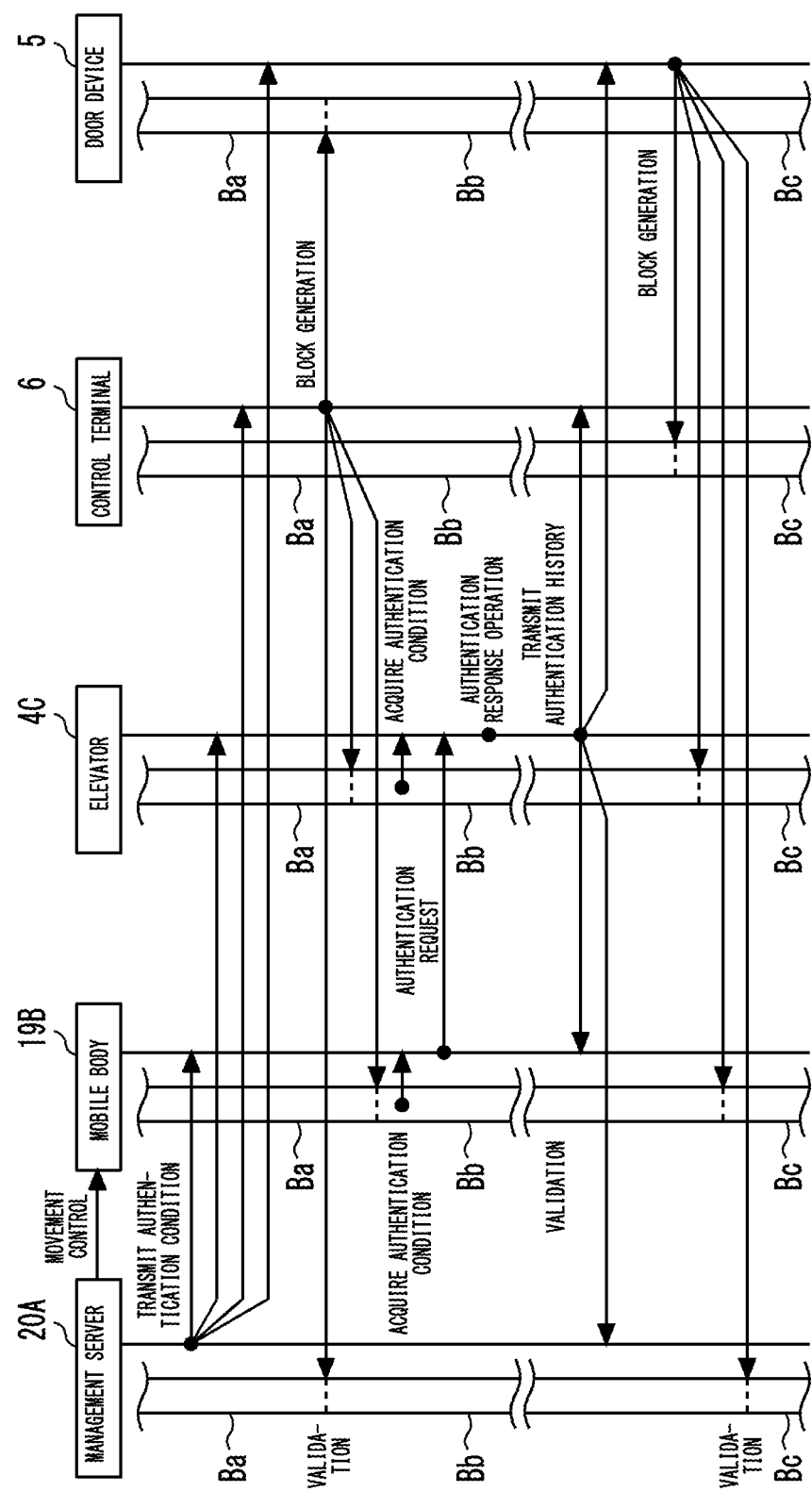

ACCESS MANAGEMENT SYSTEM, AUTHENTICATION DEVICE FOR ACCESS MANAGEMENT SYSTEM, MANAGEMENT DEVICE FOR ACCESS MANAGEMENT SYSTEM, PORTABLE TERMINAL FOR ACCESS MANAGEMENT SYSTEM, MOBILE BODY FOR ACCESS MANAGEMENT SYSTEM, DATA STRUCTURE FOR ACCESS MANAGEMENT DATA, ACCESS MANAGEMENT PROGRAM, AND CONSTRUCTION METHOD FOR ACCESS MANAGEMENT SYSTEM

CROSS-REFERENCE TO RELATED APPLICATIONS

The present application is based on PCT filing PCT/JP2020/016034, filed Apr. 9, 2020, which claims priority to PCT/JP2019/016637, filed Apr. 18, 2019, the entire contents of each are incorporated herein by reference.

FIELD

The present disclosure relates to an access management system, an authentication device for the access management system, a management device for the access management system, a portable terminal for the access management system, a mobile body for the access management system, a data structure for access management data, an access management program, and a construction method for the access management system.

BACKGROUND

PTL 1 discloses an example of an access management system. The access management system includes an electric lock, an electric lock control device, and an access management device. The electric lock control device verifies with the access management device whether verification information acquired from a storage medium is permitted verification information. The electric lock control device stores a result of the verification. When storing the result of the verification about the verification information acquired from the storage medium, the electric lock control device controls the electric lock based on the result.

CITATION LIST

Patent Literature

[PTL 1] JP 2013-91964 A

SUMMARY

Technical Problem

However, in the access management system disclosed in PTL 1, the access management device independently retains the permitted verification information. Each of a plurality of electric lock control devices independently retains the result of the verification. Accordingly, information used for the verification such as the permitted verification information and the result of the verification is likely to be falsified. When the information used for the verification is falsified, unauthorized access to a region where region entry and exit is managed by the access management system is likely to be performed.

The present disclosure relates to solution of such a problem. The present disclosure provides an access management system that reduces possibility of unauthorized access, an authentication device, a management device, a portable terminal, and a mobile body configuring the access management system, a data structure for access management data used in the access management system, an access management program executed in the access management system, and a construction method for the access management system.

Solution to Problem

An access management system according to the present disclosure is provided with a plurality of nodes connected by a P2P network, each of the plurality of nodes including: a storage unit that stores a blockchain shared among the plurality of nodes; and a validation unit that validates validity of a block added to the blockchain, at least any one of the plurality of nodes including a generation unit that generates a block added to the blockchain, a management node, which is any one of the plurality of nodes, including a registration unit that records, in blocks of the blockchain, authentication conditions including authentication information of an authenticatable passerby, and an authentication node, which is any one of the plurality of nodes and provided in a region where the passerby passes, including: a reading unit that reads authentication information of the passerby; and an authentication unit that authenticates the passerby when the authentication node is designated, in the authentication conditions recorded in the blocks of the blockchain, as a node that performs authentication and the authentication information read by the reading unit is included in the authentication conditions.

An access management system according to the present disclosure is provided with a plurality of nodes connected by a P2P network, each of the plurality of nodes including: a storage unit that stores a blockchain shared among the plurality of nodes; and a validation unit that validates validity of a block added to the blockchain, at least any one of the plurality of nodes including a generation unit that generates a block added to the blockchain, a management node, which is any one of the plurality of nodes, including a registration unit that records, in blocks of the blockchain, authentication conditions including authentication information of an authenticatable mobile body, and an authentication node, which is any one of the plurality of nodes and provided in a region where the mobile body passes, including: a reading unit that reads authentication information of the mobile body; and an authentication unit that authenticates the mobile body when the authentication node is designated, in the authentication conditions recorded in the blocks of the blockchain, as a node that performs authentication and the authentication information read by the reading unit is included in the authentication conditions.

An authentication device for an access management system according to the present disclosure is provided with: a storage unit that stores a blockchain shared among a plurality of nodes connected by a P2P network; a validation unit that validates validity of a block added to the blockchain; a reading unit that reads authentication information of a passerby; and an authentication unit that authenticates the passerby when the authentication device is designated, in authentication conditions recorded in blocks of the blockchain by a management node, which is any one of the plurality of nodes, as a node that performs authentication and the authentication information read by the reading unit is included in the authentication conditions as authentication information of an authenticatable passerby.

An authentication device for an access management system according to the present disclosure is provided with: a storage unit that stores a blockchain shared among a plurality of nodes connected by a P2P network; a validation unit that validates validity of a block added to the blockchain; a reading unit that reads authentication information of a mobile body; and an authentication unit that authenticates the mobile body when the authentication device is designated, in authentication conditions recorded in blocks of the blockchain by a management node, which is any one of the plurality of nodes, as a node that performs authentication and the authentication information read by the reading unit is included in the authentication conditions as authentication information of an authenticatable mobile body.

A management device for an access management system according to the present disclosure is provided with: a storage unit that stores a blockchain shared among a plurality of nodes connected by a P2P network; a validation unit that validates validity of a block added to the blockchain; and a registration unit that records, in blocks of the blockchain, authentication conditions including authentication information of an authenticatable passerby and designating, as a node that reads the authentication information and performs authentication, an authentication node provided in a region where the passerby passes out of the plurality of nodes.

A management device for an access management system according to the present disclosure is provided with: a storage unit that stores a blockchain shared among a plurality of nodes connected by a P2P network; a validation unit that validates validity of a block added to the blockchain; and a registration unit that records, in blocks of the blockchain, authentication conditions including authentication information of an authenticatable mobile body and designating, as a node that reads the authentication information and performs authentication, an authentication node provided in a region where the mobile body passes out of the plurality of nodes.

A portable terminal for an access management system according to the present disclosure is provided with: a storage unit that stores a blockchain shared among a plurality of nodes connected by a P2P network; a validation unit that validates validity of a block added to the blockchain; and a transmission unit that transmits, to an authentication node, with a radio signal, authentication information of an authenticatable passerby read from authentication conditions including the authentication information, designating, as a node that reads the authentication information and performs authentication, the authentication node provided in a region where the passerby passes out of the plurality of nodes, and recorded in blocks of the blockchain by a management node, which is any one of the plurality of nodes.

A mobile body for an access management system according to the present disclosure is provided with: a storage unit that stores a blockchain shared among a plurality of nodes connected by a P2P network; a validation unit that validates validity of a block added to the blockchain; and a transmission unit that transmits, to an authentication node, with a radio signal, authentication information of the mobile body read from authentication conditions including the authentication information, designating, as a node that reads the authentication information and performs authentication, the authentication node provided in a region where the mobile body passes out of the plurality of nodes, and recorded in blocks of the blockchain by a management node, which is any one of the plurality of nodes.

A data structure for an access management data according to the present disclosure is provided with a plurality of blocks coupled in a chain in order, each of the plurality of blocks including data of a hash value calculated from information concerning a block coupled immediately preceding the block, at least any one of the plurality of blocks including authentication condition data including authentication information of an authenticatable passerby and designating, from a plurality of nodes connected by a P2P network, an authentication node provided in a region where the passerby passes as a node that reads the authentication information and performs authentication, and the access management data being shared among the plurality of nodes to be used for authentication of the passerby by the authentication node performed based on the authentication condition data recorded in any one of the plurality of blocks by a management node, which is any one of the plurality of nodes.

A data structure for an access management data according to the present disclosure is provided with a plurality of blocks coupled in a chain in order, each of the plurality of blocks including data of a hash value calculated from information concerning a block coupled immediately preceding the block, at least any one of the plurality of blocks including authentication condition data including authentication information of an authenticatable mobile body and designating, from a plurality of nodes connected by a P2P network, an authentication node provided in a region where the mobile body passes as a node that reads the authentication information and performs authentication, and the access management data being shared among the plurality of nodes to be used for authentication of the mobile body by the authentication node performed based on the authentication condition data recorded in any one of the plurality of blocks by a management node, which is any one of the plurality of nodes.

An access management program according to the present disclosure causes an authentication device to execute: a step of causing the authentication device to store a blockchain shared among a plurality of nodes connected by a P2P network; a step of causing the authentication device to validate validity of a block added to the blockchain; a step of causing the authentication device to read authentication information of a passerby; and a step of causing the authentication device to authenticate the passerby when the authentication device is designated, in authentication conditions recorded in blocks of the blockchain by a management node, which is any one of the plurality of nodes, as a node that performs authentication and the read authentication information is included in the authentication conditions as authentication information of an authenticatable passerby.

An access management program according to the present disclosure causes an authentication device to execute: a step of causing the authentication device to store a blockchain shared among a plurality of nodes connected by a P2P network; a step of causing the authentication device to validate validity of a block added to the blockchain; a step of causing the authentication device to read authentication information of a mobile body; and a step of causing the authentication device to authenticate the mobile body when the authentication device is designated, in authentication conditions recorded in blocks of the blockchain by a management node, which is any one of the plurality of nodes, as a node that performs authentication and the read authentication information is included in the authentication conditions as authentication information of an authenticatable mobile body.

An access management program according to the present disclosure causes a management device to execute: a step of causing the management device to store a blockchain shared among a plurality of nodes connected by a P2P network; a step of causing the management device to validate validity of a block added to the blockchain; and a step of causing the management device to record, in blocks of the blockchain, authentication conditions including authentication information of an authenticatable passerby and designating an authentication node provided in a region where the passerby passes out of the plurality of nodes as a node that reads the authentication information and performs authentication.

An access management program according to the present disclosure causes a management device to execute: a step of causing the management device to store a blockchain shared among a plurality of nodes connected by a P2P network; a step of causing the management device to validate validity of a block added to the blockchain; and a step of causing the management device to record, in blocks of the blockchain, authentication conditions including authentication information of an authenticatable mobile body and designating an authentication node provided in a region where the mobile body passes out of the plurality of nodes as a node that reads the authentication information and performs authentication.

An access management program according to the present disclosure causes a portable terminal to execute: a step of causing the portable terminal to store a blockchain shared among a plurality of nodes connected by a P2P network; a step of causing the portable terminal to validate validity of a block added to the blockchain; and a step of causing the portable terminal to transmit, to an authentication node, with a radio signal, authentication information read from authentication conditions including the authentication information of an authenticatable passerby, designating the authentication node provided in a region where the passerby passes out of the plurality of nodes as a node that reads the authentication information and performs authentication, and recorded in blocks of the blockchain by a management node, which is any one of the plurality of nodes.

An access management program according to the present disclosure causes a mobile body to execute: a step of causing the mobile body to store a blockchain shared among a plurality of nodes connected by a P2P network; a step of causing the mobile body to validate validity of a block added to the blockchain; and a step of causing the mobile body to transmit, to an authentication node, with a radio signal, authentication information read from authentication conditions including the authentication information of the mobile body, designating the authentication node provided in a region where the mobile body passes out of the plurality of nodes as a node that reads the authentication information and performs authentication, and recorded in blocks of the blockchain by a management node, which is any one of the plurality of nodes.

A construction method for an access management system according to the present disclosure is provided with: a process for distributing a first program to an authentication device provided in a region where a passerby passes and designating the authentication device as an authentication node, which is any one of a plurality of nodes, the first program causing the authentication device to execute: a step of causing the authentication device to store a blockchain shared among the plurality of nodes connected by a P2P network; a step of causing the authentication device to validate validity of a block added to the blockchain; a step of causing the authentication device to read authentication information of the passerby; and a step of causing the authentication device to authenticate the passerby when the authentication device is designated, in authentication conditions recorded in blocks of the blockchain by a management node, which is any one of the plurality of nodes, as a node that performs authentication and the read authentication information is included in the authentication conditions as authentication information of an authenticatable passerby; and a process for distributing a second program to a management device and designating the management device as a management node, which is any one of the plurality of nodes, the second program causing the management device to execute: a step of causing the management device to store the blockchain shared among the plurality of nodes; a step of causing the management device to validate validity of a block added to the blockchain; and a step of causing the management device to record the authentication conditions in the blocks of the blockchain.

A construction method for an access management system according to the present disclosure is provided with: a process for distributing a first program to an authentication device provided in a region where a mobile body passes and designating the authentication device as an authentication node, which is any one of a plurality of nodes, the first program causing the authentication device to execute: a step of causing the authentication device to store a blockchain shared among a plurality of nodes connected by a P2P network; a step of causing the authentication device to validate validity of a block added to the blockchain; a step of causing the authentication device to read authentication information of the mobile body; and a step of causing the authentication device to authenticate the mobile body when the authentication device is designated, in authentication conditions recorded in blocks of the blockchain by a management node, which is any one of the plurality of nodes, as a node that performs authentication and the read authentication information is included in the authentication conditions as authentication information of an authenticatable mobile body; and a process for distributing a second program to a management device and designating the management device as a management node, which is any one of the plurality of nodes, the second program causing the management device to execute: a step of causing the management device to store the blockchain shared among the plurality of nodes; a step of causing the management device to validate validity of a block added to the blockchain; and a step of causing the management device to record the authentication conditions in the blocks of the blockchain.

Advantageous Effects of Invention

According to the present disclosure, the plurality of nodes connected by the P2P network share the blockchain. The authentication conditions are recorded in the blocks of the blockchain by the management node, which is any one of the plurality of nodes. The authentication conditions include the authentication information of the authenticatable target of the authentication. The authentication conditions designate the authentication node, which is any one of the plurality of nodes as the node that performs authentication. When the authentication information of the target of the authentication read by the authentication node designated in the authentication conditions is included in the authentication conditions, the target of the authentication is authenticated by the authentication node. Consequently possibility of unauthorized access is reduced.

BRIEF DESCRIPTION OF DRAWINGS

FIG. 7 is a diagram showing an example of authentication by the access management system according to Embodiment 2.

FIG. 8 is a sequence diagram showing an example of the operation by the access management system according to Embodiment 2.

DESCRIPTION OF EMBODIMENTS

Figure 1:
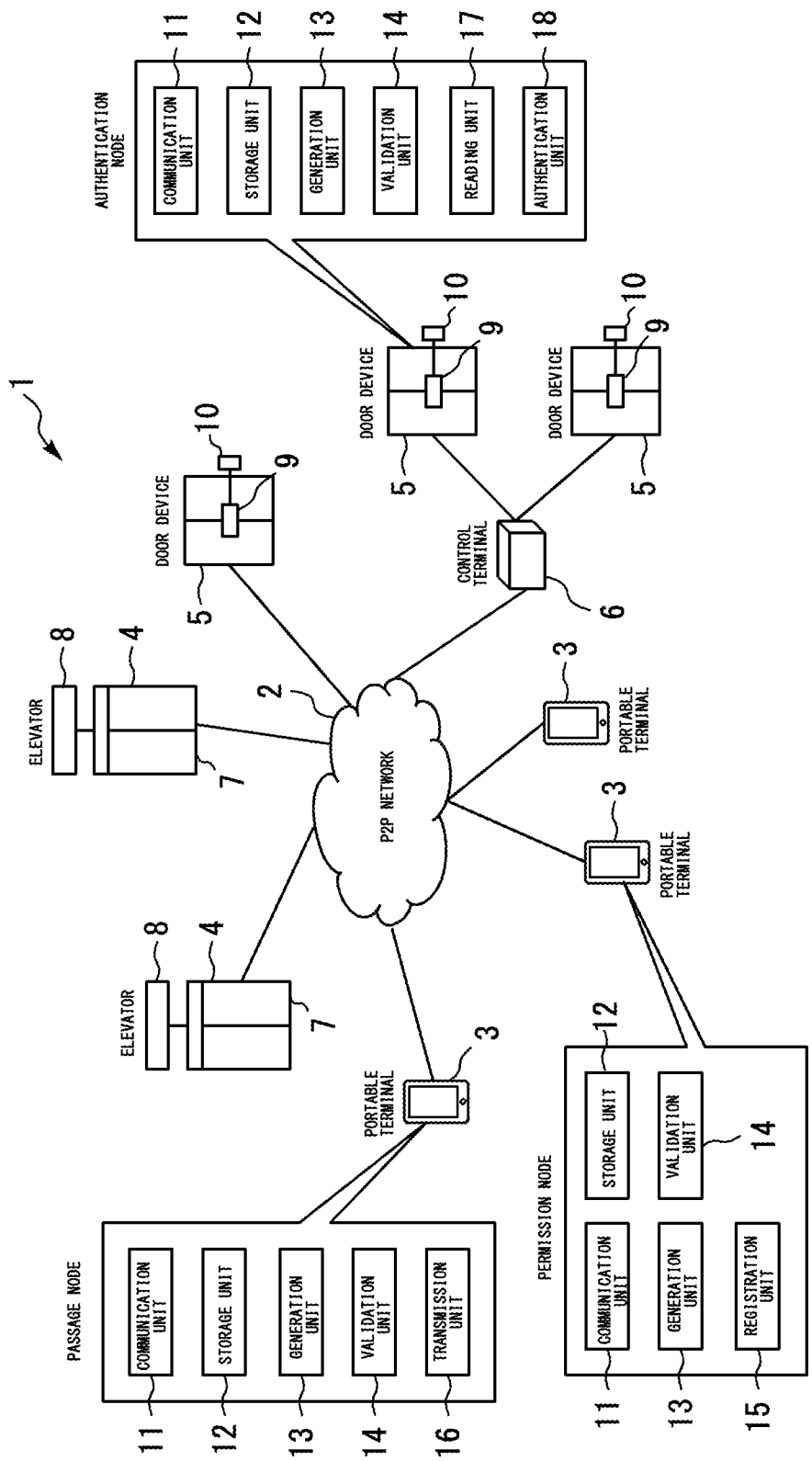
FIG. 1 is a configuration diagram of an access management system according to Embodiment 1.

Embodiments of the present disclosure are explained with reference to the accompanying drawings. In the figures, the same or equivalent portions are denoted by the same reference numerals and signs. Repetitive descriptions are simplified or omitted as appropriate.

Embodiment 1

FIG. 1 is a configuration diagram of an access management system according to Embodiment 1.

An access management system 1 is a system that manages region entry and region exit of a passerby to and from a management target region. A region managed by the access management system 1 is, for example, a space on the inside of a building. The passerby is, for example, a person entering and exiting the management target region.

The access management system 1 includes a plurality of nodes. The plurality of nodes are directly or indirectly connected to one another by a P2P network 2 (P2P: Peer to Peer). Each of the plurality of nodes of the access management system 1 is, for example, a portable terminal 3, an elevator 4, a door device 5, or a control terminal 6.

Management of region entry and exit by the access management system 1 is performed based on access management data. The access management data is shared among the plurality of nodes as a blockchain. The blockchain is a data structure including a plurality of blocks coupled in a chain. In the blockchain, the plurality of blocks are coupled in order. The access management data is stored over the plurality of blocks of the blockchain.

The portable terminal 3 are a portable information terminal carried by the passerby. The portable terminal 3 is, for example, a smartphone, a tablet PC (PC: Personal Computer), or a notebook PC.

The elevator 4 is a device that transports passersby and the like among a plurality of floors of a building. The elevator 4 includes a car 7 and a control panel 8. The car 7 is a device on which the passersby and the like ride. The control panel 8 is a device that preforms control of devices of the elevator 4 including the car 7. The control panel 8 is mounted with a function of registering a call for the car 7. The call registered by the control panel 8 includes, for example, a car call, a hall call, or a hall call designating a destination floor. The car 7 rises and falls between the plurality of floors of the building based on the registered call. The call for the car 7 may be registered by a control signal input from the outside of the elevator 4.

The door device 5 is provided on, for example, a route of the passerby who passes a region managed by the access management system 1. The door device 5 includes an electric lock 9 and a control unit 10. The electric lock 9 is a device that locks and unlocks the door device 5. The control unit 10 is a portion that controls the operation of the electric lock 9. The electric lock 9 may operate according to a control signal input from the outside of the door device 5.

The control terminal 6 is a device that controls the operation of an access management device by outputting a control signal. The access management device is a device that performs limitation, assistance, or the like of passage of the passerby. The access management device is, for example, the elevator 4 or the door device 5.

Each of the plurality of nodes of the access management system 1 includes a communication unit 11, a storage unit 12, a generation unit 13, and a validation unit 14. The communication unit 11 is a portion that performs communication with the other nodes in the P2P network 2. The storage unit 12 is a portion that stores the blockchain shared among the plurality of nodes. The generation unit 13 is a portion that generates a block added to the blockchain. The validation unit 14 is a portion that validates validity of the block added to the blockchain. The blockchain may be a blockchain in a broad sense including, for example, a data structure in which addition of a block is approved by a specified large number of nodes. A part of the plurality of nodes in the access management system 1 may not include the generation unit 13.

A part of the plurality of nodes of the access management system 1 is a permission node. The permission node is, for example, the portable terminal 3, a desktop PC, or another information terminal. The permission node is a management device of the access management system 1. The operation of the management device is executed based on, for example, an installed access management program. The permission node includes a registration unit 15. The registration unit 15 is a portion that registers authentication conditions by recording the authentication conditions in the blocks of the blockchain. The authentication conditions are conditions for authenticating the passerby. The authentication conditions include authentication information of an authenticatable passerby. The authentication information of the passerby includes, for example, an ID (Identification) of the passerby.

A part of the plurality of nodes of the access management system 1 is a passage node. The passage node is, for example, the portable terminal 3. The passage node is a device carried by the passerby. The operation of the portable terminal 3 functioning as the passage node is executed based on, for example, the installed access management program. The passage node includes a transmission unit 16. The transmission unit 16 is a portion that transmits authentication information by wireless communication. The transmission unit 16 may include, for example, an RF antenna (RF: Radio Frequency) or an LF antenna (LF: Low Frequency). The authentication information is information used for authentication of the passerby. The authentication information includes, for example, an ID of the passerby carrying the passage node.

A part of the plurality of nodes of the access management system 1 is an authentication node. The authentication node is, for example, the elevator 4, the door device 5, the control terminal 6, or another access management device. When the authentication node is the elevator 4, a function of the node of the access management system 1 is realized by, for example, the control panel 8. When the authentication node is the door device 5, the function of the node of the access management system 1 is realized by, for example, the control unit 10. The authentication node is provided in a region where the passerby passes. The authentication node is an authentication device of the access management system 1. The operation of the authentication device is executed based on, for example, the installed access management program. The authentication node includes a reading unit 17 and an authentication unit 18. The reading unit 17 is a portion that reads authentication information transmitted from the passage node by, for example, wireless communication. The reading unit 17 may include, for example, an RF antenna or an LF antenna. The authentication unit 18 is a portion that authenticates the passerby based on the authentication conditions recorded in the blockchain.

The authentication by the authentication unit 18 is performed when the authentication node including the authentication unit 18 is designated, in the authentication conditions, as a node that performs authentication. The authentication unit 18 performs the authentication based on whether authentication information read by the reading unit 17 from the passage node carried by the passerby is included in the authentication conditions as authenticatable authentication information.

The authentication unit 18 performs an authentication response operation when authenticating the passerby. When the authentication node is the elevator 4, the authentication response operation is, for example, registration of a call for the car 7. The authentication response operation may be operation in which the authentication unit 18 directly performs the registration of the call. Alternatively, the authentication response operation may be operation in which the authentication unit 18 indirectly performs the registration of the call by outputting a control signal for performing the registration of the call to the control panel 8. When the authentication node is the door device 5, the authentication response operation is, for example, unlock of the electric lock 9. The authentication response operation may be either the direct operation or the indirect operation by the authentication unit 18. When the authentication node is the control terminal 6, the authentication response operation is, for example, an output of a control signal.

The authentication unit 18 records an authentication history in the blocks of the blockchain to register the authentication history when authenticating the passerby. The authentication history is information representing a history of authentication. The authentication history includes, for example, information for identifying an authentication node that authenticates a passerby, information for identifying the passerby, and information concerning time when the passerby is authenticated.

The access management system 1 is constructed by distributing the access management program to each of the plurality of nodes and causing the node to install the access management program. The access management program is distributed from, for example, a distribution server through a network such as the Internet. Alternatively, the access management program may be distributed offline through, for example, a storage medium. The access management program may be a program of a different type corresponding to a type of a node. Alternatively, the access management program may be a program of a single type, operation of which is switched according to a type of a node.

Subsequently, an example of a data structure of the blockchain shared in the access management system 1 is explained with reference to FIG. 2.

Figure 2:
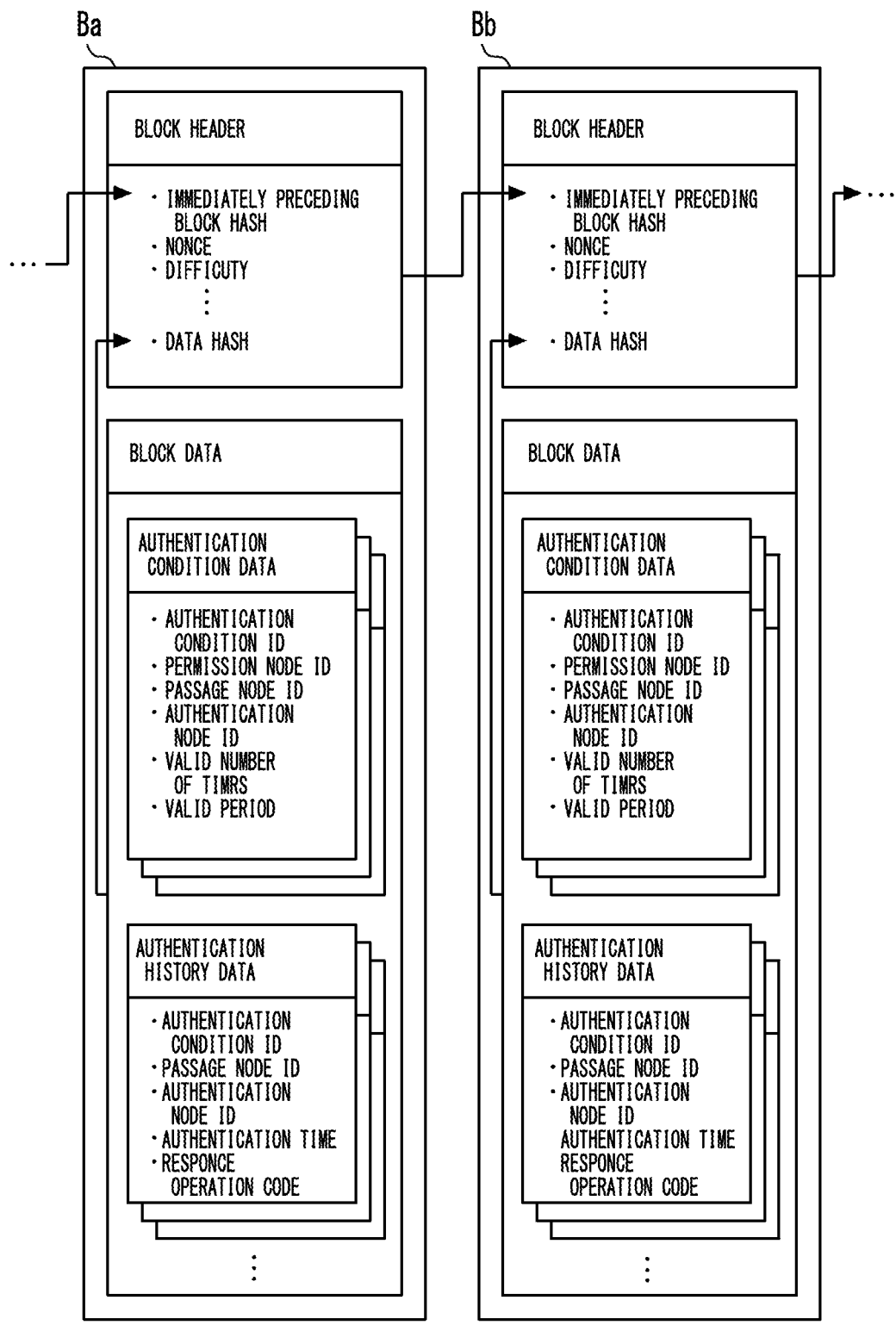
FIG. 2 is a diagram showing an example of the data structure for access management data according to Embodiment 1.

FIG. 2 is a diagram showing an example of the data structure for access management data according to Embodiment 1.

The access management data has a data structure of a blockchain. In this example, the blockchain includes a block Ba and a block Bb. The block Ba is a block immediately preceding the block Bb.

Each of a plurality of blocks includes a block header and block data.

The block header includes an immediately preceding block hash, a nonce, a difficulty, and a data hash. The immediately preceding block hash is a hash value of a block header of an immediately preceding block. In this example, the block header of the block Bb includes a hash of the block header of the block Ba as the immediately preceding block hash. In the blockchain, the plurality of blocks are chained by including the immediately preceding block hash. The nonce is a fixed-length value defining a block having validity as a block added to the blockchain. The difficulty is the reciprocal value of a threshold for setting difficulty of calculation for calculating a value of a nonce of the block having validity. The block having validity is a block, a hash of a block header of which is smaller than the threshold. Accordingly, the calculation for calculating a value of the nonce of the block having validity is more difficult as a value of the difficulty is larger. Validation of validity of a block includes, for example, confirmation that a hash of the block header including the nonce is smaller than the reciprocal value of the difficulty. The data hash is a hash value of block data included in the same block. The block header may include a timestamp.

The block data is information recorded in the blockchain. The block data includes authentication condition data and authentication history data.

The authentication condition data is data representing authentication conditions. The authentication condition data includes, for example, an authentication condition ID, a permission node ID, a passage node ID, an authentication node ID, a valid number of times, and a valid period. The authentication condition ID is information for identifying the authentication conditions. The permission node ID is information for identifying a permission node in which the authentication conditions are registered. The passage node ID is information for identifying a passage node carried by a passerby for whom authentication is possible. The authentication node ID is information for identifying an authentication node designated as a node that performs authentication. The valid number of times is information concerning an upper limit of the number of times the authentication node can authenticate the passage node based on the authentication conditions. The valid period is information concerning a period in which the authentication node can authenticate the passage node based on the authentication conditions. In the access management system 1, an upper limit may be set for the valid period.

The authentication history data is data representing an authentication history. The authentication history data includes, for example, an authentication condition ID, a passage node ID, an authentication node ID, authentication time, and a response operation code. The authentication condition ID is information for identifying authentication conditions on which authentication of the authentication history is based. The passage node ID is information for identifying a passage node carried by a passerby authenticated by the authentication node. The authentication node ID is information for identifying the authentication node that performs the authentication of the passerby. The authentication time is information concerning time when the authentication node authenticates the passerby. The response operation code is information representing an authentication response operation performed when the authentication node authenticates the passerby.

Subsequently, an example of authentication by the access management system 1 is explained with reference to FIG. 3.

Figure 3:
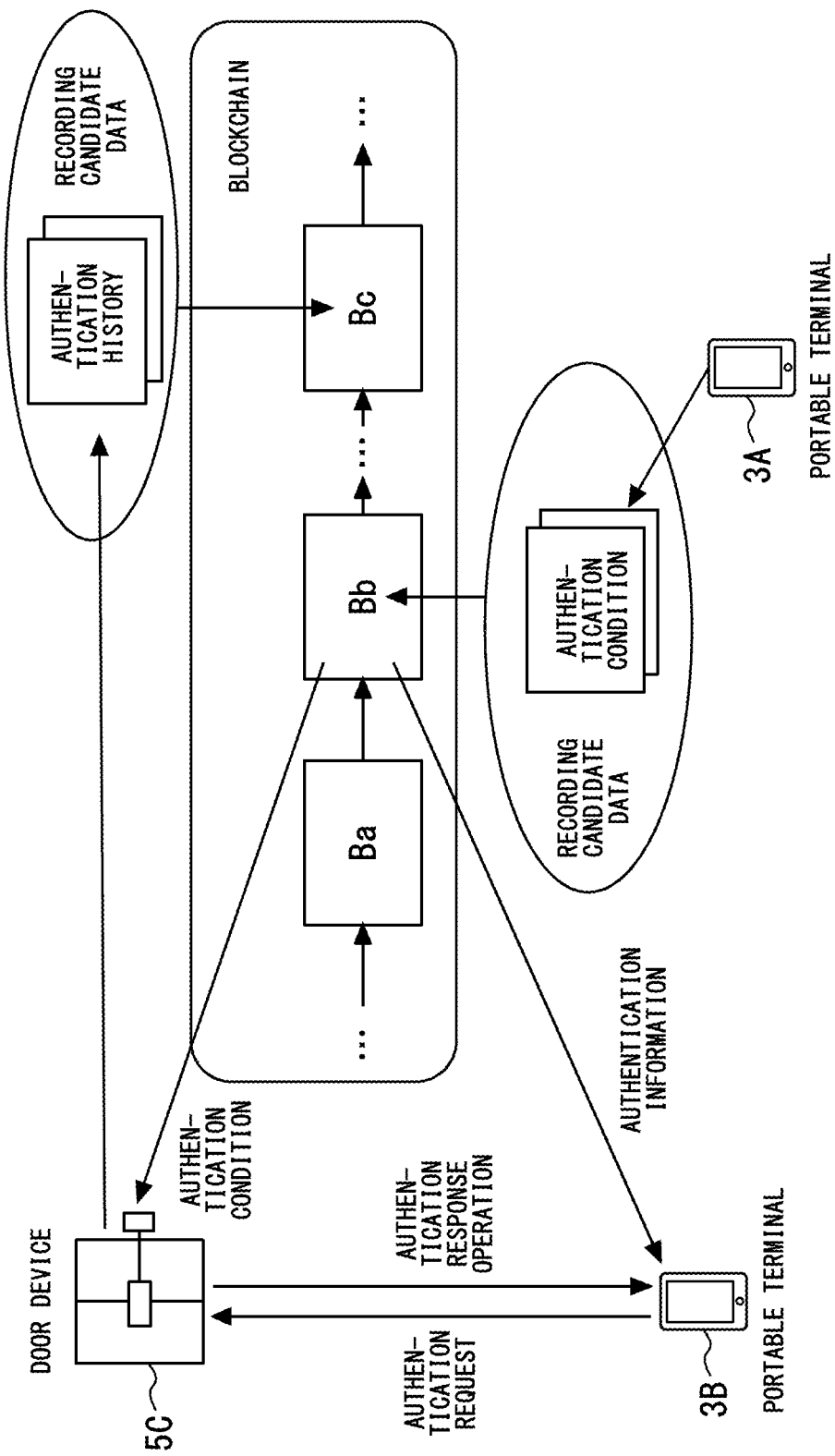
FIG. 3 is a diagram showing an example of authentication by the access management system according to Embodiment 1.

FIG. 3 is a diagram showing an example of authentication by the access management system according to Embodiment 1.

In this example, a case is explained in which a user A permits a user B to pass a door device 5C. The user A carries a portable terminal 3A. The portable terminal 3A is an example of the permission node. The user B carries a portable terminal 3B. The portable terminal 3B is an example of the passage node. The door device 5C is provided on a route that the user B passes. The door device 5C is an example of the authentication node.

The user A inputs authentication conditions from the portable terminal 3A. The registration unit 15 of the portable terminal 3A encrypts the input authentication conditions. The registration unit 15 transmits the encrypted authentication conditions to the plurality of nodes connected to the P2P network 2. When transmitting the authentication conditions, the registration unit 15 may add an electronic signature of the user A. The encryption of the authentication conditions is performed such that the encrypted authentication conditions can be decrypted in the portable terminal 3B and the door device 5C. The registration unit 15 transmits, for example, both of the authentication conditions encrypted by a public key of the portable terminal 3B and the authentication conditions encrypted by a public key of the door device 5C to the other nodes. Alternatively, when the portable terminal 3B and the door device 5C have a common attribute, the registration unit 15 may transmit the authentication conditions encrypted by an attribute-based encryption or the like to the other nodes.

Each of the plurality of nodes of the access management system 1 temporarily retains, as recording candidate data, the authentication conditions received from the portable terminal 3A. The recording candidate data may be retained by the storage unit 12. A node not including the generation unit 13 may not retain the recording candidate data. A node including the generation unit 13 attempts to generate a block including the recording candidate data. The generation unit 13 searches for a value of a nonce to be a block having validity. Thereafter, the generation unit 13 of any one of the plurality of nodes succeeds in generating the block having validity. The node including the generation unit 13 succeeding in generating the block transmits the generated block to the plurality of nodes connected to the P2P network 2.

The validation unit 14 of each of the plurality of nodes of the access management system 1 validates validity of the received block. The validation unit 14 performs the validation based on a consensus algorithm predetermined in the access management system 1. The consensus algorithm is, for example, an algorithm based on PoW (Proof of Work). As a part of the validation of validity of the block, the validation unit 14 confirms that a hash of a block header is smaller than the reciprocal value of difficulty of the block. When the hash of the block header is equal to or larger than the reciprocal value of the difficulty of the block, the validation unit 14 determines that the block is invalid. At this time, the block determined as invalid is not added to the blockchain. On the other hand, a block determined by the validation unit 14 as having validity is added to the blockchain stored by the storage unit 12. In this way, the validation of the block is performed in the validation unit 14 of each of the plurality of nodes by the predetermined consensus algorithm. Consequently, the blockchain stored in the storage unit 12 of each of the plurality of nodes is synchronized. In this example, the authentication conditions input from the portable terminal 3A is recorded in the block Bb of the blockchain.

The portable terminal 3B reads the authentication conditions from the block Bb of the blockchain stored in the storage unit 12. The portable terminal 3B decrypts the encrypted authentication conditions. The portable terminal 3B acquires the authentication information included in the decrypted authentication conditions. The portable terminal 3B acquires for example, an authentication condition ID, a passage node ID, and an authentication node ID as the authentication information. Alternatively, the authentication conditions may include an ID of a passerby. At this time, the portable terminal 3B may acquire the authentication condition ID, the ID of the passerby, and the authentication node ID as the authentication information.

The door device 5C reads the authentication conditions from the block Bb of the blockchain stored in the storage unit 12. The door device 5C decrypts the encrypted authentication conditions. When an electronic signature of the user A is added to the authentication conditions, the door device 5C may discard the authentication conditions when the electronic signature of the user A is invalid. The door device 5C may discard the authentication conditions when the valid period included in the authentication conditions has already expired. When the upper limit is set for the valid period in the access management system 1, the door device 5C may retrieve only authentication conditions recorded in blocks generated from time retroactive by a time period equivalent to the upper limit of the valid period to the present. At this time, the door device 5C performs authentication of the passerby based on the retrieved authentication conditions.

The user B passes, while carrying the portable terminal 3B, a route in which the door device 5C is provided. The door device 5C transmits, for example, a radio signal including an authentication node ID of the door device 5C. When the authentication node ID included in the radio signal transmitted by the door device 5C is an authentication node ID included in authentication information acquired from the block Bb, the portable terminal 3B determines that the door device 5C is a designated authentication node. The transmission unit 16 of the portable terminal 3B transmits, with a radio signal, an authentication request including the authentication information acquired from the block Bb such that the reading unit 17 of a designated authentication node can receive the authentication request.

The reading unit 17 of the door device 5C receives the authentication request transmitted by the portable terminal 3B. The reading unit 17 reads the authentication information from the received authentication request. The authentication unit 18 determines whether the authentication information read by the reading unit 17 includes the authentication node ID of the door device 5C. When the authentication node ID of the door device 5C is included in the authentication information, the authentication unit 18 determines that the authentication unit 18 is designated, in the authentication conditions, as a node that performs authentication. At this time, the authentication unit 18 determines whether a passage node ID included in the authentication information read by the reading unit 17 is included in the authentication conditions acquired from the block Bb as authentication information of an authenticatable passerby. When the read passage node ID is included in the authentication conditions as the authentication information of the authenticatable passerby, the authentication unit 18 authenticates the user B. The user B, who is the passerby, is an example of a target of the authentication.

When authenticating the user B, the authentication unit 18 of the door device 5C performs an authentication response operation. As the authentication response operation, the door device 5C unlocks the electric lock 9. The user B passes a route in which the door device 5C, which unlocks the electric lock 9, is provided.

When authenticating the user B, the authentication unit 18 of the door device 5C generates an authentication history. The authentication unit 18 transmits the generated authentication history to the plurality of nodes connected to the P2P network 2. When transmitting the authentication history, the authentication unit 18 may add an electronic signature of the door device 5C.

Each of the plurality of nodes of the access management system 1 temporarily retains, as recording candidate data, the authentication history received from the door device 5C. The node including the generation unit 13 attempts to generate a block including the recording candidate data. Thereafter, the generation unit 13 of any one of the plurality of nodes succeeds in generation of a block having validity. The node including the generation unit 13 succeeding in the generation of the block transmits the generated block to the plurality of nodes connected to the P2P network 2.

The validation unit 14 of each of the plurality of nodes of the access management system 1 validates validity of the received block. The block determined by the validation unit 14 as having validity is added to the blockchain stored by the storage unit 12. In this example, the authentication history generated by the door device 5C is recorded in a block Bc of the blockchain.

In the access management system 1, validation of the authentication history is performed, for example, as explained below.

A validator, who performs the validation of the authentication history, validates the authentication history using a not-shown information terminal. About the blockchain shared by the plurality of nodes in the access management system 1, the information terminal retrieves block data retroactively from the latest block to blocks preceding the latest block.

Every time the information terminal detects an authentication history recorded in the blocks of the blockchain, the information terminal adds 1 to the number of times of authentication about an authentication condition ID included in the authentication history. When detecting authentication conditions recorded in a block retroactive from the block, the information terminal detects unauthorized access when the number of times of authentication about an authentication condition ID of the authentication conditions exceeds a valid number of times included in the authentication conditions.

When detecting an authentication history recorded in the blocks of the blockchain, the information terminal correlates and stores an authentication condition ID and authentication time included in the authentication history. When detecting authentication conditions recorded in a block retroactive from the block, the information terminal detects unauthorized access when authentication time correlated with an authentication condition ID of the authentication conditions exceeds a valid period included in the authentication conditions.

When an upper limit is set for the valid period in the access management system 1, the information terminal may retrieve only authentication conditions recorded in blocks generated from the authentication time of the authentication history to time retroactive by a time period equivalent to the upper limit of the valid period. At this time, the information terminal performs validation of the authentication history based on the retrieved authentication conditions.

Subsequently, an example of the operation of the access management system 1 is explained with reference to FIG. 4.

Figure 4:
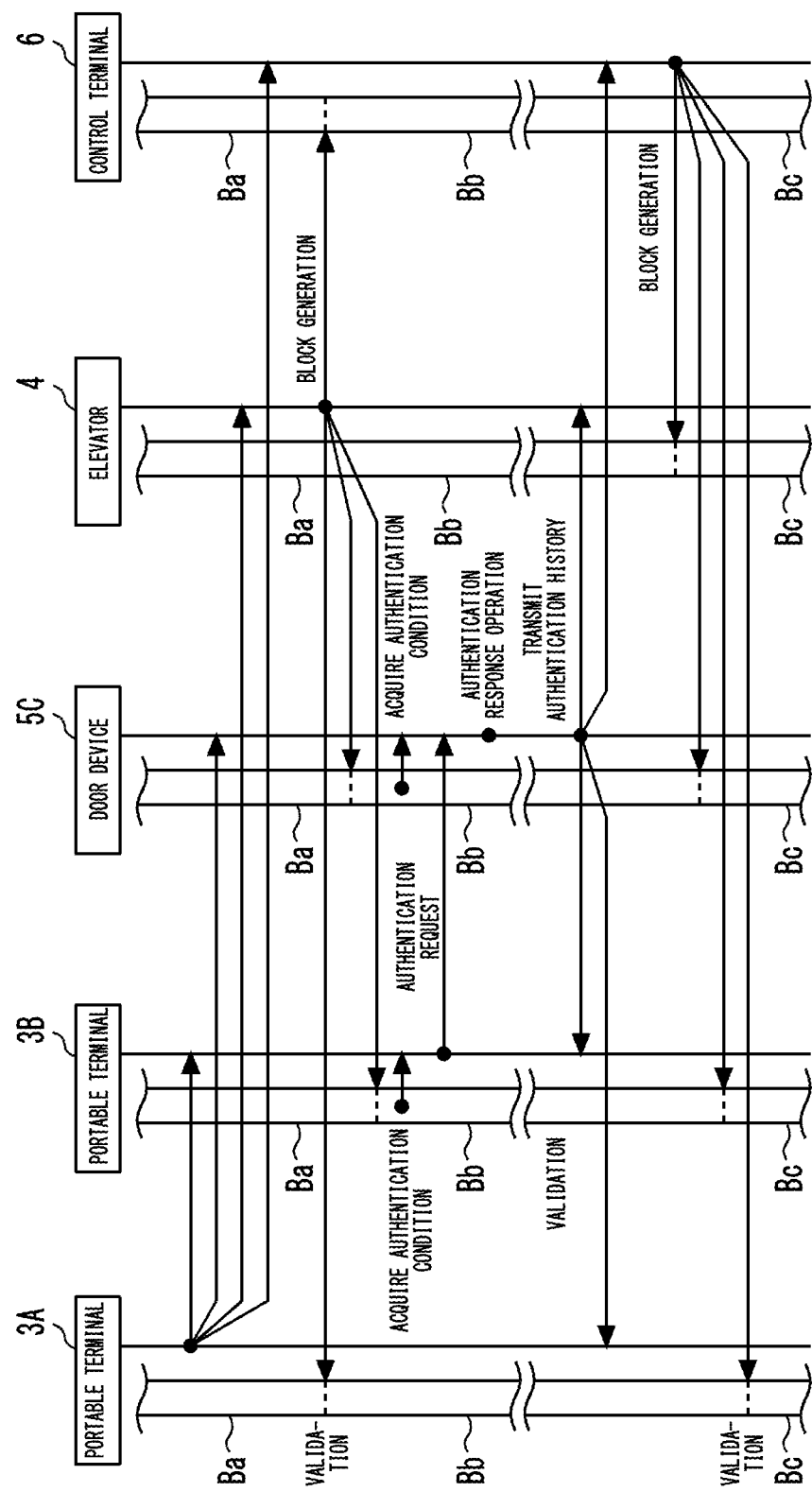
FIG. 4 is a sequence diagram showing an example of operation by the access management system according to Embodiment 1.

FIG. 4 is a sequence diagram showing an example of operation by the access management system according to Embodiment 1.

The registration unit 15 of the portable terminal 3A transmits input authentication conditions to each of the plurality of nodes.

Thereafter, for example, the generation unit 13 of the elevator 4 succeeds in generation of a block including the authentication conditions. The generation unit 13 of the elevator 4 transmits the generated block to each of the plurality of nodes. The validation unit 14 of each of the plurality of nodes, which receives the generated block, validates validity of the block. When validity of the block is validated, the storage unit 12 adds the block to the stored blockchain. In this example, the block is added as the next block Bb of the block Ba. On the other hand, when validity of the block is not validated, the storage unit 12 does not add the block determined as invalid to the blockchain.

Thereafter, the portable terminal 3B acquires authentication information from the block Bb stored by the storage unit 12. The door device 5C acquires authentication conditions from the block Bb stored by the storage unit 12.

Thereafter, the transmission unit 16 of the portable terminal 3B transmits an authentication request including the authentication information to the door device 5C.

Thereafter, the reading unit 17 of the door device 5C reads the authentication information from the received authentication request. The authentication unit 18 authenticates the user B based on the authentication information read by the reading unit 17 and the authentication conditions acquired from the block Bb. When authenticating the user B, the authentication unit 18 performs an authentication response operation.

Thereafter, the authentication unit 18 of the door device 5C generates an authentication history. The authentication unit 18 transmits the generated authentication history to each of the plurality of nodes.

Thereafter, for example, the generation unit 13 of the control terminal 6 succeeds in generation of a block including the authentication history. The generation unit 13 of the control terminal 6 transmits the generated block to each of the plurality of nodes. The validation unit 14 of each of the plurality of nodes, which receives the generated block, validates validity of the block. When validity of the block is validated, the storage unit 12 adds the block to the stored blockchain. In this example, the block is added as the block Bc. On the other hand, when validity of the block is not validated, the storage unit 12 does not add the block determined as invalid to the blockchain.

As explained above, the access management system 1 according to Embodiment 1 includes a plurality of nodes connected by the P2P network 2. Each of the plurality of nodes includes the storage unit 12 and the validation unit 14. The storage unit 12 stores a blockchain shared among the plurality of nodes. The validation unit 14 validates validity of a block added to the blockchain. At least any one of the plurality of nodes includes the generation unit 13. The generation unit 13 generates a block added to the blockchain. A management node, which is any one of the plurality of nodes, includes the registration unit 15. The registration unit 15 records authentication conditions in the blocks of the blockchain. The authentication conditions include authentication information of an authenticatable passerby. An authentication node, which is any one of the plurality of nodes, includes the reading unit 17. The authentication node is provided in a region where the passerby passes. The reading unit 17 reads authentication information of the passerby. The authentication unit 18 authenticates the passerby when the authentication unit 18 is designated, in the authentication conditions recorded in the blocks of the blockchain, as a node that performs authentication and the authentication information read by the reading unit 17 is included in the authentication conditions.

The authentication device of the access management system 1 according to Embodiment 1 includes the storage unit 12, the validation unit 14, the reading unit 17, and the authentication unit 18. The storage unit 12 stores a blockchain shared among a plurality of nodes. The plurality of nodes are connected by the P2P network 2. The validation unit 14 validates validity of a block added to the blockchain. The reading unit 17 reads authentication information of a passerby. A management node is any one of the plurality of nodes. Authentication conditions are recorded in blocks of the blockchain by the management node. The authentication unit 18 authenticates the passerby when the authentication unit 18 is designated, in the authentication conditions, as a node that performs authentication and the authentication information read by the reading unit 17 is included in the authentication conditions as authentication information of an authenticatable passerby.

The management device of the access management system 1 according to Embodiment 1 includes the storage unit 12, the validation unit 14, and the registration unit 15. The storage unit 12 stores a blockchain shared among a plurality of nodes. The plurality of nodes are connected by the P2P network 2. The validation unit 14 validates validity of a block added to the blockchain. The registration unit 15 records authentication conditions in blocks of the blockchain. The authentication conditions include authentication information of an authenticatable passerby. The authentication conditions designate an authentication node provided in a region where the passerby passes out of the plurality of nodes as a node that reads the authentication information and performs authentication.

The portable terminal 3 of the access management system 1 according to Embodiment 1 includes the storage unit 12, the validation unit 14, and the transmission unit 16. The storage unit 12 stores a blockchain shared among a plurality of nodes. The plurality of nodes are connected by the P2P network 2. The validation unit 14 validates validity of a block added to the blockchain. The transmission unit 16 transmits, with a radio signal, authentication information read from authentication conditions to an authentication node. The authentication conditions include authentication information of an authenticatable passerby. The authentication conditions designate an authentication node out of the plurality of nodes as a node that reads the authentication information and performs authentication. The authentication node is provided in a region where the passerby passes. The authentication conditions are recorded in blocks of the blockchain by a management node, which is any one of the plurality of nodes.

A data structure for access management data according to Embodiment 1 includes a plurality of blocks coupled in a chain in order. Each of the plurality of blocks includes data of a hash value calculated from information concerning a block coupled immediately preceding the block. At least any one of the plurality of blocks includes authentication condition data. The authentication condition data includes authentication information of an authenticatable passerby. The authentication condition data designates an authentication node out of a plurality of nodes as a node that reads the authentication information and performs authentication. The authentication node is provided in a region where the passerby passes. The plurality of nodes are connected by the P2P network 2. The access management data is shared among the plurality of nodes to be used for authentication of the passerby by the authentication node. The authentication of the passerby by the authentication node is performed based on the authentication condition data recorded in any one of the plurality of blocks by a management node. The management node is any one of the plurality of nodes.

An access management program according to Embodiment 1 causes an authentication device to execute a storing step, a validating step, a reading step, and an authenticating step. The storing step is a step of storing a blockchain shared among a plurality of nodes connected by the P2P network 2. The validating step is a step of validating validity of a block added to the blockchain. The reading step is a step of reading authentication information of a passerby. The authenticating step is a step of authenticating the passerby when the authentication device is designated, in authentication conditions, as a node that performs authentication and the read authentication information is included in the authentication conditions as authentication information of an authenticatable passerby. The authentication conditions are recorded in blocks of the blockchain by a management node. The management node is any one of the plurality of nodes.

An access management program according to Embodiment 1 causes a management device to execute a storing step, a validating step, and a registering step. The storing step is a step of storing a blockchain shared among a plurality of nodes connected by the P2P network 2. The validating step is a step of validating validity of a block added to the blockchain. The registering step is a step of recording authentication conditions in blocks of the blockchain. The authentication conditions include authentication information of an authenticatable passerby. The authentication conditions designate an authentication node out of the plurality of nodes as a node that reads the authentication information and performs authentication. The authentication node is provided in a region where the passerby passes.

An access management program according to Embodiment 1 causes the portable terminal 3 to execute a storing step, a validating step, and a transmitting step. The storing step is a step of storing a blockchain shared among a plurality of nodes connected by the P2P network 2. The validating step is a step of validating validity of a block added to the blockchain. The transmitting step is a step of transmitting, with a radio signal, authentication information read from authentication conditions to an authentication node. The authentication conditions include authentication information of an authenticatable passerby. The authentication conditions designate the authentication node out of the plurality of nodes as a node that reads the authentication information and performs authentication. The authentication node is provided in a region where the passerby passes. The authentication conditions are recorded in blocks of the blockchain by a management node. The management node is any one of the plurality of nodes.

A construction method for the access management system 1 according to Embodiment 1 includes an authentication-node constructing process and a management-node constructing process. The authentication-node constructing process is a process for distributing a first program to an authentication device and making the authentication device into an authentication node, which is any one of a plurality of nodes. The authentication device is provided in a region where a passerby passes. The first program causes the authentication device to execute a storing step, a validating step, a reading step, and an authenticating step. The storing step is a step of storing a blockchain shared among a plurality of nodes connected by the P2P network 2. The validating step is a step of validating validity of a block added to the blockchain. The reading step is a step of reading authentication information of the passerby. The authenticating step is a step of authenticating the passerby when the authentication device is designated, in authentication conditions, as a node that performs authentication and the read authentication information is included in the authentication conditions as authentication information of an authenticatable passerby. The authentication conditions are recorded in blocks of the blockchain by a management node. The management node is any one of the plurality of nodes. The management-node constructing process is a process for distributing a second program to a management device and making the management device into the management node, which is any one of the plurality of nodes. The second program causes the management device to execute the storing step, the validating step, and a registering step. The registering step is a step of recording the authentication conditions in the blocks of the blockchain.

The plurality of nodes connected by the P2P network 2 share the blockchain. The authentication conditions are recorded in the blocks of the blockchain by the management node, which is any one of the plurality of nodes. The authentication conditions include the authentication information of the authenticatable passerby. The authentication conditions designate the authentication node, which is any one of the plurality of nodes, as the node that performs authentication. When the authentication information of the passerby read by the authentication node designated in the authentication conditions is included in the authentication conditions, the passerby is authenticated by the authentication node. In this way, authentication of a passerby accessing a region where region entry and exit is managed is performed based on the authentication conditions recorded in the blockchain. Since the blockchain is a distributed ledger distributed and managed in the plurality of nodes, the blockchain is less easily falsified. Consequently, possibility of unauthorized access is reduced. The authentication node stores the blockchain in the storage unit 12 of the authentication node. Accordingly, it is unnecessary to inquire, for example, a server about the authentication conditions every time authentication is performed. Consequently, even when a large number of authentications are simultaneously necessary, a communication load does not increase.

A passage node, which is any one of the plurality of nodes, includes the transmission unit 16. The passage node is carried by the passerby. The transmission unit 16 transmits, with a radio signal, the authentication information of the passerby. The reading unit 17 of the authentication node reads the authentication information transmitted by the transmission unit 16 with the radio signal.

As the node sharing the blockchain, an information terminal carried by the passerby can be included. Consequently, it is possible to increase types and the number of nodes. Entities that manage the nodes are various. Accordingly, it is more difficult to falsify the information recorded in the blockchain.

The registration unit 15 records, in the blocks of the blockchain, authentication conditions encrypted to be decryptable by the passage node and the authentication node. The passage node is carried by a passerby authenticatable in the authentication conditions. The authentication node is designated in the authentication conditions.

Consequently, the authentication conditions recorded in the blockchain are prevented from being known to outsiders. Accordingly, unauthorized authentication by outsiders that read the authentication conditions is prevented. The validation unit 14 may not perform validation of validity of the authentication condition data itself in the validation of validity of a block. In other words, the authentication condition data may not be data that requires validation of data itself in the validation of validity of a block like, for example, transaction data of a token. At this time, even in data in an encrypted state, each of the plurality of nodes can validate and add a generated block.

When a hash value calculated from a block generated by the generation unit 13 of any one of the plurality of nodes is equal to or larger than a set threshold, the validation unit 14 determines that the block is invalid. The storage unit 12 does not add the block determined as invalid to the blockchain.

The validation unit 14 of each of the plurality of nodes performs validation of a block generated by the consensus algorithm based on the PoW. Since a lot of calculation cost is necessary for falsification of the blockchain, it is difficult to falsify the information recorded in the blockchain.

Note that the authentication node may be the door device 5. The door device 5 is provided on the route that a passerby passes. The door device 5 includes the electric lock 9. The electric lock 9 is unlocked or locked when the authentication unit 18 authenticates the passerby.

The authentication node may be the control terminal 6. When the authentication unit 18 authenticates the passerby, the control terminal 6 unlocks or locks the electric lock 9 provided in the door device 5 on the route that the passerby passes.

The authentication node may be the elevator 4. The elevator 4 includes the car 7 on which a passerby rides. When authenticating the passerby, the elevator 4 performs registration of a call for the car 7 on which the passerby rides.

As the nodes sharing the blockchain, devices such as the door device 5, the control terminal 6, and the elevator 4 can be included. Consequently, types and the number of nodes can be increased. Accordingly, it is more difficult to falsify the information recorded in the blockchain.

The validation unit 14 may set a threshold set in validation of a block generated by the generation unit 13 of the authentication node to a value larger than a threshold set in validation of a block generated by the generation unit 13 of a node, which is not the authentication node, and validate validity of a block added to the blockchain.

The validation unit 14 may set a threshold for validation to a different value according to a type of a node including the generation unit 13, which generates the block, and perform validation. The validation unit 14 may set the threshold for validation to a value obtained by multiplying the reciprocal value of difficulty by a coefficient corresponding to the type of the node including the generation unit 13, which generates the block, and perform validation. At this time, the coefficient for the authentication node is set to a value larger than the coefficient for the node, which is not the authentication node.

The validation unit 14 may determine the block generated by the generation unit 13 of the node, which is not the authentication node, as invalid.

The storage unit 12 does not add the block determined invalid to the blockchain.

The authentication node can also perform control of, for example, the door device 5 or the elevator 4. Accordingly, information processing resources of the authentication node are sometimes fewer than information processing resources of the other nodes. Even the authentication node having few processing resources in this way can contribute to generation of a block if the authentication node includes the generation unit 13. In general, an entity that manages the authentication node often has high incentive to improve reliability of the access management system 1. Since a node managed by such an entity can contribute to generation of a block, unauthorized access is more effectively prevented.

The authentication unit 18 retrieves authentication conditions recorded in blocks generated from time retroactive by a preset time period to the present. The authentication unit 18 authenticates a passerby based on the retrieved authentication conditions.

The preset time period is a time period equivalent to, for example, an upper limit of a valid period.

The authentication unit 18 scans not all of the blocks for the retrieval of the authentication conditions. Accordingly, even when the information processing resources of the authentication node are limited, it is easy to authenticate a passerby.

When authenticating a passerby, the authentication unit 18 records information concerning an authentication history in the blocks of the blockchain. The authentication history includes information for identifying the authentication node including the authentication unit 18, information for identifying the passerby, and information concerning time when the passerby is authenticated.

At least any one of the plurality of blocks includes authentication history data in the blockchain. The authentication history data includes information for identifying the authentication node that authenticates a passerby, information for identifying the passerby, and information concerning time when the passerby is authenticated.

A history of authentication of passersby is recorded in the blockchain shared in the plurality of nodes. Consequently, even when unauthorized access occurs, a record of the access is less easily falsified.

Note that the blockchain may include, in the block data, data other than the access management data. The blockchain may include, in the block data, for example, transaction data of a token or balance data of the token.

The validation unit 14 may perform the validation of a block according to an algorithm other than the consensus algorithm based on the PoW. The validation unit 14 may perform the validation of a block according to, for example, a consensus algorithm based on PoS (Proof of Stake) depending on a token holding amount. The validation unit 14 may perform the validation of a block according to, for example, a consensus algorithm for allowing the authentication node that performs more authentications to more easily succeed in generation of a block. The authentication node may acquire a token when authenticating a passerby.

The portable terminal 3 may not be a node of the P2P network 2. In this case, the portable terminal 3 may transmit, with a radio signal, a specific ID held as authentication information. The portable terminal 3 may be, for example, a hands-free tag.

The reading unit 17 may read authentication information with an encoded image such as a two-dimensional code displayed on the passage node. The authentication information may be displayed as an encoded image on, for example, a screen of the passage node. The reading unit 17 may read the authentication information from the passage node by, for example, visible light communication. At this time, the authentication information may be transmitted from the transmission unit 16 of the passage node by, for example, visible light communication.

A node on the outside of the access management system 1 may be connected to the P2P network 2 in the access management system 1.

Subsequently, an example of a hardware configuration of a node of the access management system 1 is explained with reference to FIG. 5.

Figure 5:
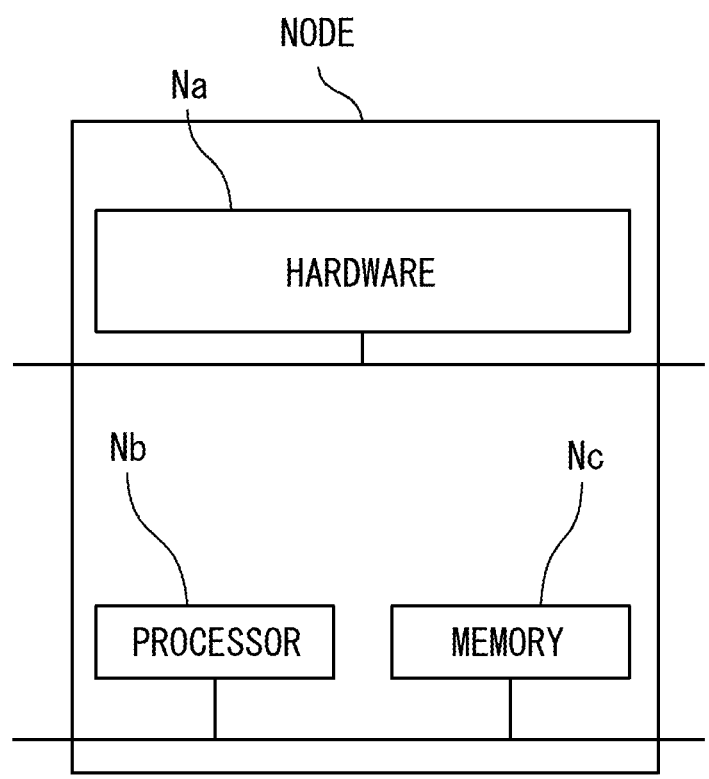
FIG. 5 is a diagram showing a hardware configuration of a node of the access management system according to Embodiment 1.

FIG. 5 is a diagram showing a hardware configuration of a node of the access management system according to Embodiment 1.

Functions of the node of the access management system 1 can be realized by a processing circuit. The processing circuit includes at least one processor Nb and at least one memory Nc. The processing circuit may include at least one dedicated hardware Na together with or as a substitute for the processor Nb and the memory Nc.

When the processing circuit includes the processor Nb and the memory Nc, the functions of the node are realized by software, firmware, or a combination of the software and the firmware. At least one of the software and the firmware is described as a program. The program is stored in the memory Nc. The processor Nb realizes the functions of the node by reading out and executing the program stored in the memory Nc.

The processor Nb is referred to as a CPU (Central Processing Unit), a processing device, an arithmetic device, a microprocessor, a microcomputer, and a DSP as well. The memory Nc is configured by a nonvolatile or volatile semiconductor memory such as RAM, ROM, a flash memory, an EPROM, or an EEPROM, a magnetic disk, a flexible disk, an optical disk, a compact disk, a minidisk, or a DVD.

When the processing circuit includes the dedicated hardware Na, the processing circuit is realized by, for example, a single circuit, a composite circuit, a programmed processor, a parallel-programmed processor, an ASIC, an FPGA, or a combination of the foregoing.

The functions of the node can be respectively realized by processing circuits. Alternatively, the functions of the node can be collectively realized by a processing circuit. A part of the functions of the node may be realized by the dedicate hardware Na and the other part of the functions of the node may be realized by software or firmware. In this way, the processing circuit realizes the functions of the node with the dedicated hardware Na, software, firmware, or a combination of the foregoing.

Embodiment 2

In Embodiment 2, differences from the example disclosed in Embodiment 1 are explained particularly in detail. Concerning characteristics not explained in Embodiment 2, any characteristics in the example disclosed in Embodiment 1 may be adopted.

Figure 6:
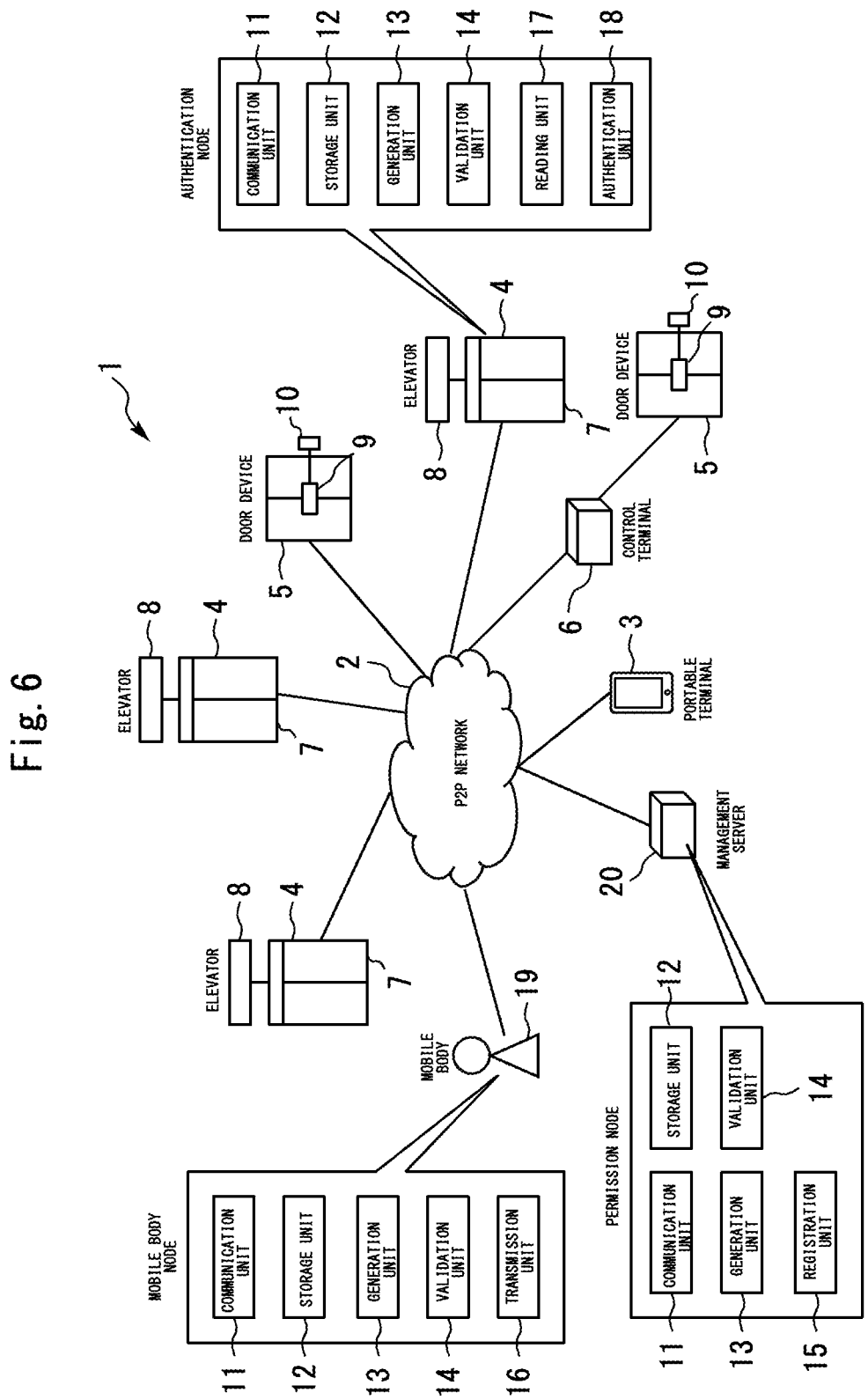
FIG. 6 is a configuration diagram of an access management system according to Embodiment 2.

FIG. 6 is a configuration diagram of an access management system according to Embodiment 2.

The access management system 1 manages entry and exit of a passing body to and from a management target region. The passing body is a person, a machine, or the like that enters and exits the management target region. The access management system 1 includes a plurality of nodes directly or indirectly connected to one another by the P2P network 2. Each of the plurality of nodes is, for example, the portable terminal 3, the elevator 4, the door device 5, the control terminal 6, a mobile body 19, or a management server 20. The passing body includes a passerby carrying the portable terminal 3 and the mobile body 19. In this example, the elevator 4 includes a plurality of cars 7.

The access management system 1 according to Embodiment 2 performs region entry and region exit management and the like for the passing body in the same manner as region entry and region exit management and the like for the passerby performed by the access management system according to Embodiment 1. The access management system 1 according to Embodiment 2 performs authentication, authentication response, and the like for the passing body like the access management system according to Embodiment 1 for the passerby. In other words, the operations of the region entry and region exit management, the authentication, the authentication response, and the like in the access management system 1 according to Embodiment 2 are performed based on access management data shared among the plurality of nodes as a blockchain. The access management data according to Embodiment 2 have the same structure as the access management data according to Embodiment 1.

The access management system 1 according to Embodiment 2 is constructed in the same manner as the access management system according to Embodiment 1. In other words, the access management system 1 is constructed by, for example, distributing an access management program to each of the plurality of nodes and causing each of the plurality of nodes to install the access management program.

The mobile body 19 is a device that moves in a place including a management target region. The mobile body 19 includes, for example, an autonomous mobile robot, a remotely-operated mobile robot, or a mobility on which a person rides.

The management server 20 is a server that manages the mobile body 19. The management server 20 may be mounted with a function of remotely controlling the movement of the mobile body 19. At this time, the management server 20 is connected to the mobile body 19 through, for example, the P2P network 2 or another network such as the Internet. The management server 20 is, for example, a server computer. The management server 20 may be a virtual server on a cloud service.

A permission node in the access management system 1 is, for example, the portable terminal 3, a desktop PC, the management server 20, or another information terminal. Authentication conditions registered in the blocks of the blockchain by the registration unit 15 of the permission node are conditions for authenticating a passing body such as a passerby or the mobile body 19. The authentication conditions include authentication information for an authenticatable passing body. The authentication information for the passing body includes, for example, an ID of the passerby or an ID of the mobile body 19.

The mobile body 19 is a mobile body node of the access management system 1. The mobile body node is included in the plurality of nodes of the access management system 1. The operation of the mobile body 19 functioning as the mobile body node is executed based on, for example, the installed access management program. The mobile body node includes the transmission unit 16. The transmission unit 16 transmits, by wireless communication, authentication information used for authentication of the mobile body 19. The transmission unit 16 may include, for example, an RF antenna or an LF antenna. The authentication information includes, for example, an ID of the mobile body 19, which is the mobile body node.

Subsequently, an example of a data structure for access management data shared as the blockchain in the access management system 1 is explained. Block data included in blocks of the access management data includes authentication condition data and authentication history data.

The authentication condition data includes, for example, an authentication condition ID, a permission node ID, a passing body ID, an authentication node ID, a valid number of times, a valid period, and attribute information of a passing body. The passing body ID is, for example, information for identifying a passage node carried by an authenticatable passerby or information for identifying the mobile body 19, which is an authenticatable mobile body node. The attribute information of the passing body is information representing an attribute of the passing body. The attribute of the passerby includes information, for example, a pattern of use such as presence or absence of use of a movement support tool such as a wheelchair or a desire when using such as whether to accept riding on the car 7 together with the mobile body 19. The attribute of the mobile body 19 includes information such as a type of use of the mobile body 19, a scale of the mobile body 19, and presence or absence of a function of the mobile body 19. The type of use of the mobile body 19 represents a classification of a service provided by the mobile body 19 such as "emergency", "guarding", or "meal service". The scale of the mobile body 19 includes, for example, the size, the weight, or the like of the mobile body 19. The function of the mobile body 19 includes, for example, a function of riding together with a person in the car 7.

The authentication history data includes, for example, an authentication condition ID, a passing body ID, an authentication node ID, authentication time, and a response operation code. The authentication condition ID is information for identifying authentication conditions on which authentication of the authentication history is based. The passing body ID is information for identifying a passage node carried by a passerby authenticated by the authentication node, information for identifying a mobile body node authenticated by the authentication node, or the like. The authentication node ID is information for identifying an authentication node that performs authentication of a passing body. The authentication time is information concerning time when the authentication node authenticates the passing body. The response operation code is information representing an authentication response operation performed when the authentication node authenticates the passing body.

Subsequently, an example of authentication by the access management system 1 is explained with reference to FIG. 7.

FIG. 7 is a diagram showing an example of authentication by the access management system according to Embodiment 2.

In this example, a case is explained in which a management server 20A permits a mobile body 19B to use an elevator 4C. The management server 20A is an example of the permission node. The management server 20A remotely controls movement of the mobile body 19B. The management server 20A remotely controls the mobile body 19B to move on a route on which the elevator 4C is used. The mobile body 19B is an example of the mobile body node. The elevator 4C is an example of the authentication node. The elevator 4C includes a plurality of cars 7. The elevator 4C includes a group management device that selects, out of the plurality of cars 7, the car 7 to which a call is allocated.

The registration unit 15 of the management server 20A encrypts the authentication conditions. The authentication node designated in the authentication conditions includes the elevator 4C designated based on a route on which the management server 20A moves the mobile body 19B. The registration unit 15 transmits the encrypted authentication conditions to the plurality of nodes connected to the P2P network 2. When transmitting the authentication conditions, the registration unit 15 may add an electronic signature of the management server 20A. The encryption of the authentication conditions is performed such that the encrypted authentication conditions can be decrypted in the mobile body 19B and the elevator 4C. The registration unit 15 transmits, for example, both of the authentication conditions encrypted by a public key of the mobile body 19B and the authentication conditions encrypted by a public key of the elevator 4C to the other nodes. Alternatively, when the mobile body 19B and the elevator 4C have a common attribute, the registration unit 15 may transmit the authentication conditions encrypted by an attribute-based encryption or the like to the other nodes.

Each of the plurality of nodes of the access management system 1 temporarily retains, as recording candidate data, the authentication conditions received from the management server 20A. The recording candidate data may be retained in the storage unit 12. A node not including the generation unit 13 may not retain the recording candidate data. A node including the generation unit 13 attempts to generate a block including the recording candidate data. The generation unit 13 searches for a value of a nonce to be a block having validity. Thereafter, the generation unit 13 of any one of the plurality of nodes succeeds in generating the block having validity. The node including the generation unit 13 succeeding in generating the block transmits the generated block to the plurality of nodes connected to the P2P network 2.

The validation unit 14 of each of the plurality of nodes of the access management system 1 validates validity of the received block. The validation unit 14 performs the validation based on a consensus algorithm such as PoW predetermined in the access management system 1. At this time, the block determined as invalid is not added to the blockchain. On the other hand, a block determined by the validation unit 14 as having validity is added to the blockchain stored by the storage unit 12. In this way, the validation of the block is performed in the validation unit 14 of each of the plurality of nodes by the predetermined consensus algorithm. Consequently, the blockchain stored in the storage unit 12 of each of the plurality of nodes is synchronized. In this example, the authentication conditions input from the management server 20A is recorded in the block Bb of the blockchain.

The mobile body 19B reads the authentication conditions from the block Bb of the blockchain stored in the storage unit 12. The mobile body 19B decrypts the encrypted authentication conditions. The mobile body 19B acquires the authentication information included in the decrypted authentication conditions. The mobile body 19B acquires, as the authentication information, for example, an authentication condition ID, an ID of the mobile body 19B, which is a passing body ID, and an authentication node ID.

The elevator 4C reads the authentication conditions from the block Bb of the blockchain stored in the storage unit 12. The elevator 4C decrypts the encrypted authentication conditions. When the electronic signature of the management server 20A is added to the authentication conditions, the elevator 4C may discard the authentication conditions when the electronic signature of the management server 20A is invalid. The elevator 4C may discard the authentication conditions when the valid period included in the authentication conditions has already expired. When the upper limit is set for the valid period in the access management system 1, the elevator 4C may retrieve only authentication conditions recorded in blocks generated from time retroactive by a time period equivalent to the upper limit of the valid period to the present. At this time, the elevator 4C performs authentication of the mobile body 19B based on the retrieved authentication conditions.

The management server 20A moves the mobile body 19B to a hall of the elevator 4C. When the mobile body 19B enters the hall of the elevator 4C, the management server 20A causes the transmission unit 16 of the mobile body 19B to transmit, with a radio signal, an authentication request including the authentication information acquired from the block Bb.

The reading unit 17 of the elevator 4C receives the authentication request transmitted by the mobile body 19B. The reading unit 17 reads the authentication information from the received authentication request. The authentication unit 18 determines whether the authentication information read by the reading unit 17 includes the authentication node ID of the elevator 4C. When the authentication node ID of the elevator 4C is included in the authentication information, the authentication unit 18 determines that the authentication unit 18 is designated, in the authentication conditions, as a node that performs authentication. At this time, the authentication unit 18 determines whether a passing body ID included in the authentication information read by the reading unit 17 is included in the authentication conditions acquired from the block Bb as authentication information of an authenticatable passing body. When the read passing body ID is included in the authentication conditions as the authentication information of the authenticatable passing body, the authentication unit 18 authenticates the mobile body 19B. The mobile body 19B, which is the passing body, is an example of the target of the authentication.

The authentication unit 18 of the elevator 4C performs an authentication response operation when authenticating the mobile body 19B. As the authentication response operation, the elevator 4C selects the car 7 to which a call of the mobile body 19B is allocated out of the plurality of cars 7.

At this time, the elevator 4C performs the allocation of the call based on, for example, priority corresponding to an attribute of the mobile body 19B, which is the target of the authentication. For example, when the type of use of the mobile body 19B is "emergency" having high priority, the call of the mobile body 19B is more preferentially allocated than a call of the mobile body 19, the priority of the type of use of which is "meal service" having low priority. The elevator 4C performs the allocation of the call such that, for example, a time period until the elevator 4C reaches a destination floor is shorter for a call having higher priority.

Alternatively, the elevator 4C allocates the call of the mobile body 19B to any car 7 based on, for example, the attribute of the mobile body 19B, which is the target of the authentication. For example, the elevator 4C determines whether possible to ride on the same car 7 together with other passing bodies based on a scale of the mobile body 19B, presence or absence of a function of the mobile body 19B, or the like. The elevator 4C allocates the call of the mobile body 19B to any car 7 based on a determination result of whether possible to ride on the same car 7 together with the other passing bodies.

The management server 20A causes the mobile body 19B to ride on the car 7 to which the call is allocated. Thereafter, the management server 20A causes the mobile body 19B to get off the car 7 in a destination floor.

When authenticating the mobile body 19B, the authentication unit 18 of the elevator 4C generates an authentication history. The authentication unit 18 transmits the generated authentication history to the plurality of nodes connected to the P2P network 2. When transmitting the authentication history, the authentication unit 18 may add an electronic signature of the elevator 4C.

Each of the plurality of nodes of the access management system 1 temporarily retains, as recording candidate data, the authentication history received from the elevator 4C. A node including the generation unit 13 attempts to generate a block including the recording candidate data. Thereafter, the generation unit 13 of any one of the plurality of nodes succeeds in generation of a block having validity. The node including the generation unit 13 succeeding in the generation of the block transmits the generated block to the plurality of nodes connected to the P2P network 2.

The validation unit 14 of each of the plurality of nodes of the access management system 1 validates validity of the received block. The block determined as having validity by the validation unit 14 is added to the blockchain stored by the storage unit 12. In this example, the authentication history generated by the elevator 4C is recorded in the block Bc of the blockchain.

Subsequently, an example of the operation of the access management system 1 is explained with reference to FIG. 8.

FIG. 8 is a sequence diagram showing an example of the operation by the access management system according to Embodiment 2.

The registration unit 15 of the management server 20A transmits, to each of the plurality of nodes, authentication conditions generated based on a route that the mobile body 19B passes.

Thereafter, for example, the generation unit 13 of the control terminal 6 succeeds in generation of a block including the authentication conditions. The generation unit 13 of the control terminal 6 transmits the generated block to each of the plurality of nodes. The validation unit 14 of each of the plurality of nodes, which receives the generated block, validates validity of the block. When validity of the block is validated, the storage unit 12 adds the block to the stored blockchain. In this example, the block is added as the next block Bb of the block Ba. On the other hand, when validity of the block is not validated, the storage unit 12 does not add the block determined as invalid to the blockchain.

Thereafter, the mobile body 19B acquires authentication information from the block Bb stored by the storage unit 12. The elevator 4C acquires authentication conditions from the block Bb stored by the storage unit 12.

Thereafter, the transmission unit 16 of the mobile body 19B transmits an authentication request including the authentication information to the elevator 4C.

Thereafter, the reading unit 17 of the elevator 4C reads the authentication information from the received authentication request. The authentication unit 18 authenticates the mobile body 19B based on the authentication information read by the reading unit 17 and the authentication conditions acquired from the block Bb. When authenticating the mobile body 19B, the authentication unit 18 performs an authentication response operation.

Thereafter, the authentication unit 18 of the elevator 4C generates an authentication history. The authentication unit 18 transmits the generated authentication history to each of the plurality of nodes.

Thereafter, for example, the generation unit 13 of the door device 5 succeeds in generation of a block including the authentication history. The generation unit 13 of the door device 5 transmits the generated block to each of the plurality of nodes. The validation unit 14 of each of the plurality of nodes, which receives the generated block, validates validity of the block. When validity of the block is validated, the storage unit 12 adds the block to the stored blockchain. In this example, the block is added as the block Bc. On the other hand, when validity of the block is not validated, the storage unit 12 does not add the block determined as invalid to the blockchain.

As explained above, the access management system 1 according to Embodiment 2 includes a plurality of nodes connected by the P2P network 2. Each of the plurality of nodes includes the storage unit 12 and the validation unit 14. The storage unit 12 stores a blockchain shared among the plurality of nodes. The validation unit 14 validates validity of a block added to the blockchain. At least any one of the plurality of nodes includes the generation unit 13. The generation unit 13 generates a block added to the blockchain. A management node, which is any one of the plurality of nodes, includes the registration unit 15. The registration unit 15 records authentication conditions in blocks of the blockchain. The authentication conditions include authentication information of the authenticatable mobile body 19. An authentication node, which is any one of the plurality of nodes, includes the reading unit 17. The authentication node is provided in a region where the mobile body 19 passes. The reading unit 17 reads the authentication information of the mobile body 19. When the authentication unit 18 is designated, in the authentication conditions recorded in the blocks of the blockchain, as a node that performs authentication and the authentication information read by the reading unit 17 is included in the authentication conditions, the authentication unit 18 authenticates the mobile body 19.

An authentication device of the access management system 1 according to Embodiment 2 includes the storage unit 12, the validation unit 14, the reading unit 17, and the authentication unit 18. The storage unit 12 stores a blockchain shared among a plurality of nodes. The plurality of nodes are connected by the P2P network 2. The validation unit 14 validates validity of a block added to the blockchain. The reading unit 17 reads authentication information of the mobile body 19. A management node is any one of the plurality of nodes. Authentication conditions are recorded in blocks of the blockchain by the management node. When the authentication unit 18 is designated, in the authentication conditions, as a node that performs authentication and the authentication information read by the reading unit 17 is included in the authentication conditions as authentication information of the authenticatable mobile body 19, the authentication unit 18 authenticates the mobile body 19.

A management device of the access management system 1 according to Embodiment 2 includes the storage unit 12, the validation unit 14, and the registration unit 15. The storage unit 12 stores a blockchain shared among a plurality of nodes. The plurality of nodes are connected by the P2P network 2. The validation unit 14 validates validity of a block added to the blockchain. The registration unit 15 records authentication conditions in blocks of the blockchain. The authentication conditions include authentication information of the authenticatable mobile body 19. The authentication conditions designate an authentication node provided in a region where the mobile body 19 passes out of the plurality of nodes as a node that reads the authentication information and performs authentication.

The mobile body 19 of the access management system 1 according to Embodiment 2 includes the storage unit 12, the validation unit 14, and the transmission unit 16. The storage unit 12 stores a blockchain shared among a plurality of nodes. The plurality of nodes are connected by the P2P network 2. The validation unit 14 validates validity of a block added to the blockchain. The transmission unit 16 transmits, with a radio signal, authentication information read from authentication conditions to an authentication node. The authentication conditions include authentication information of the mobile body 19 itself. The authentication conditions designate the authentication node out of the plurality of nodes as a node that reads the authentication information and performs authentication. The authentication node is provided in a region where the mobile body 19 itself passes. The authentication conditions are recorded in blocks of the blockchain by a management node, which is any one of the plurality of nodes.

A data structure for access management data according to Embodiment 2 includes a plurality of blocks coupled in a chain in order. Each of the plurality of blocks includes data of a hash value calculated from information concerning a block coupled immediately preceding the block. At least any one of the plurality of blocks includes authentication condition data. The authentication condition data includes authentication information of the authenticatable mobile body 19. The authentication condition data designates an authentication node out of a plurality of nodes as a node that reads the authentication information and performs authentication. The authentication node is provided in a region where the mobile body 19 passes. The plurality of nodes are connected by the P2P network 2. The access management data is shared among the plurality of nodes to be used for authentication of the mobile body 19 by the authentication node. The authentication of the mobile body 19 by the authentication node is performed based on the authentication condition data recorded in any one of the plurality of blocks by a management node. The management node is any one of the plurality of nodes.

An access management program according to Embodiment 2 causes an authentication device to execute a storing step, a validating step, a reading step, and an authenticating step. The storing step is a step of storing a blockchain shared among a plurality of nodes connected by the P2P network 2. The validating step is a step of validating validity of a block added to the blockchain. The reading step is a step of reading authentication information of the mobile body 19. The authenticating step is a step of authenticating the mobile body 19 when the authentication device is designated, in authentication conditions, as a node that performs authentication and the read authentication information is included in the authentication conditions as authentication information of the authenticatable mobile body 19. The authentication conditions are recorded in blocks of the blockchain by a management node. The management node is any one of the plurality of nodes.

An access management program according to Embodiment 2 causes a management device to execute a storing step, a validating step, and a registering step. The storing step is a step of storing a blockchain shared among a plurality of nodes connected by the P2P network 2. The validating step is a step of validating validity of a block added to the blockchain. The registering step is a step of recording authentication conditions in blocks of the blockchain. The authentication conditions include authentication information of the authenticatable mobile body 19. The authentication conditions designate an authentication node out of the plurality of nodes as a node that reads the authentication information and performs authentication. The authentication node is provided in a region where the mobile body 19 passes.

An access management program according to Embodiment 2 causes the mobile body 19 to execute a storing step, a validating step, and a transmitting step. The storing step is a step of storing a blockchain shared among a plurality of nodes connected by the P2P network 2. The validating step is a step of validating validity of a block added to the blockchain. The transmitting step is a step of transmitting, with a radio signal, authentication information read from authentication conditions to an authentication node. The authentication conditions include authentication information of the authenticatable mobile body 19 itself. The authentication conditions designate the authentication node out of the plurality of nodes as a node that reads the authentication information and performs authentication. The authentication node is provided in a region where the mobile body 19 itself passes. The authentication conditions are recorded in blocks of the blockchain by a management node. The management node is any one of the plurality of nodes.

A construction method for the access management system 1 according to Embodiment 2 includes an authentication-node constructing process and a management-node constructing process. The authentication-node constructing process is a process for distributing a first program to an authentication device and designating the authentication device as an authentication node, which is any one of a plurality of nodes. The authentication device is provided in a region where the mobile body 19 passes. The first program causes the authentication device to execute a storing step, a validating step, a reading step, and an authenticating step. The storing step is a step of storing a blockchain shared among a plurality of nodes connected by the P2P network 2. The validating step is a step of validating validity of a block added to the blockchain. The reading step is a step of reading authentication information of the mobile body 19. The authenticating step is a step of authenticating the mobile body 19 when the authentication device is designated, in authentication conditions, as a node that performs authentication and the read authentication information is included in the authentication conditions as authentication information of the authenticatable mobile body 19. The authentication conditions are recorded in blocks of the blockchain by a management node. The management node is any one of the plurality of nodes. The management-node constructing process is a process for distributing a second program to a management device and designating the management device as the management node, which is any one of the plurality of nodes. The second program causes the management device to execute the storing step, the validating step, and a registering step. The registering step is a step of recording the authentication conditions in the blocks of the blockchain.

The plurality of nodes connected by the P2P network 2 share the blockchain. The authentication conditions are recorded in the blocks of the blockchain by the management node, which is any one of the plurality of nodes. The authentication conditions include the authentication information of the authenticatable mobile body 19. The authentication conditions designate the authentication node, which is any one of the plurality of nodes, as the node that performs authentication. When the authentication information of the mobile body 19 read by the authentication node designated in the authentication conditions is included in the authentication conditions, the mobile body 19 is authenticated by the authentication node. In this way, authentication of the mobile body 19 accessing a region where region entry and exit is managed is performed based on the authentication conditions recorded in the blockchain. Since the blockchain is a distributed ledger distributed and managed in the plurality of nodes, the blockchain is less easily falsified. Consequently, possibility of unauthorized access is reduced. The authentication node stores the blockchain in the storage unit 12 of the authentication node. Accordingly, it is unnecessary to inquire, for example, a server about the authentication conditions every time authentication is performed. Consequently, even when a large number of authentications are simultaneously necessary, a communication load does not increase.

A mobile body node, which is any one of the plurality of nodes, includes the transmission unit 16. The mobile body node is the mobile body 19. The transmission unit 16 transmits, with a radio signal, the authentication information of the mobile body 19 itself. The reading unit 17 of the authentication node reads the authentication information transmitted by the transmission unit 16 with the radio signal.

The management node is the management server 20 that remotely controls the movement of the mobile body 19.

As the node sharing the blockchain, the mobile body 19 itself can be included. As the node sharing the blockchain, the management server 20 that remotely controls the movement of the mobile body 19 can be included. Consequently, it is possible to increase types and the number of nodes. Entities that manage the nodes are various. Accordingly, it is more difficult to falsify the information recorded in the blockchain. The management server 20 can easily specify the authentication node on the route that the mobile body 19 passes. Consequently, the registration of the authentication conditions is more smoothly performed.

The registration unit 15 records, in the blocks of the blockchain, authentication conditions encrypted by the mobile body node and the authentication node to be decryptable. The mobile body node is the mobile body 19 authenticatable in the authentication conditions. The authentication node is designated in the authentication conditions.

Consequently, the authentication conditions recorded in the blockchain are prevented from being known to outsiders. Accordingly, unauthorized authentication by outsiders that read the authentication conditions is prevented. The validation unit 14 may not perform validation of validity of the authentication condition data itself in the validation of validity of a block. In other words, the authentication condition data may not be data that requires validation of data itself in the validation of validity of a block like, for example, transaction data of a token. At this time, even in data in an encrypted state, each of the plurality of nodes can validate and add a generated block.

The registration unit 15 records, in the blocks of the blockchain, an attribute of a target of the authentication authenticatable in the authentication conditions. The authentication node, which is the elevator 4, performs registration of a call of the target based on priority corresponding to the attribute of the target of the authentication. The authentication node, which is the elevator 4, includes a plurality of cars 7. The authentication node allocates a call of an authenticated target to any one of the cars based on an attribute of the target.

Consequently, the elevator 4 is operated according to an attribute of the mobile body 19 or the like, which is the target of the authentication. The mobile body 19 can move among a plurality of floors according to quickness or the like necessary for a provided service. Unpleasant feeling due to riding together with the mobile body 19 is less easily given to the other users of the elevator 4. Note that the elevator 4 may perform allocation of a call based on priority corresponding to an attribute of a passerby. For example, the elevator 4 may allocate a call at higher priority, for example, when the passerby is using a movement support tool such as a wheelchair. The elevator 4 may allocate a call of an authenticated passerby to any one of the cars 7 based on an attribute of the passerby. For example, the elevator 4 determines whether to accept riding on the same car 7 together with the mobile body 19 or the like based on, for example, a desire to use of the passerby. The elevator 4 allocates a call of the passerby to any one of the cars 7 based on a determination result of whether to accept riding together with the mobile body 19 or the like.

The mobile body 19 may not be a node of the P2P network 2. In this case, the mobile body 19 may transmit, with a radio signal, a specific ID held as authentication information.

The reading unit 17 may read the authentication information with an encoded image such as a two-dimensional code displayed on the passage node. The authentication information may be displayed as an encoded image on, for example, a screen of the mobile body node. The reading unit 17 may read the authentication information from the mobile body node by, for example, visible light communication. At this time, the authentication information may be transmitted from the transmission unit 16 of the mobile body node by, for example, visible light communication.

The access management system 1 may manage authentication, authentication response, and the like and region entry and region exit and the like of only the passerby, who is a person as a passing body. The access management system 1 may manage authentication, authentication response, and the like and region entry and region exit and the like of only the mobile body 19, which is a device as a passing body. The access management system 1 may manage authentication, authentication response, and the like and region entry and region exit and the like of both passerby, who is a person as a passing body, and the mobile body 19, which is a device as a passing body.

INDUSTRIAL APPLICABILITY

The access management system according to the present disclosure can be applied to, for example, a building including a region where region entry and exit is managed. The authentication device, the management device, the portable terminal, and the mobile body, the data structure, and the access management program according to the present disclosure can be applied to the access management system. The construction method according to the present disclosure can be applied to construction of the access management system.

REFERENCE SIGNS LIST

1 Access management system
2 P2P network
3, 3A, 3B Portable terminal

4 Elevator
5, 5C Door device
6 Control terminal
7 Car
8 Control panel
9 Electric lock
10 Control unit
11 Communication unit
12 Storage unit
13 Generation unit
14 Validation unit
15 Registration unit
16 Transmission unit
17 Reading unit
18 Authentication unit
19, 19B Mobile body
20, 20A Management server
Ba, Bb, Bc Block
Na Hardware
Nb Processor
Nc Memory

The invention claimed is:

1. An access management system comprising a plurality of nodes connected by a peer-to-peer (P2P) network,
   each of the plurality of nodes including processing circuitry:
      to store a blockchain shared among the plurality of nodes; and
      to validate validity of a block added to the blockchain, wherein
   in at least any one of the plurality of nodes, the processing circuitry generate a block added to the blockchain,
   in a management node, which is any one of the plurality of nodes, the processing circuitry record in blocks of the blockchain, authentication conditions including authentication information of an authenticatable passing body, and
   in an authentication node, which is any one of the plurality of nodes and provided in a region where the passing body passes,
      the processing circuitry read authentication information of the passing body; and
      authenticate the passing body when the authentication node is designated, in the authentication conditions recorded in the blocks of the blockchain, as a node that performs authentication and the read authentication information is included in the authentication conditions,
   the processing circuitry of each of the plurality of nodes determines, when a hash value calculated from a block generated by the processing circuitry of any one of the plurality of nodes is equal to or larger than a set threshold, the block as invalid, and does not add the block determined as invalid to the blockchain, and
   the processing circuitry of each of the plurality of nodes sets a threshold set in validation of a block generated by the processing circuitry of the authentication node to a value larger than a threshold set in validation of a block generated by the processing circuitry of the node, which is not the authentication node, and validates validity of a block added to the blockchain.

2. The access management system according to claim 1, wherein
   in a passage node, which is any one of the plurality of nodes and carried by a passerby who is the passing body, the processing circuitry transmit, with a radio signal, the authentication information of the passerby, and
   the processing circuitry of the authentication node reads the authentication information transmitted by the passage node with the radio signal.

3. The access management system according to claim 2, wherein the processing circuitry of the management node records, in the blocks of the blockchain, the authentication conditions encrypted to be decryptable by the passage node carried by the passerby authenticatable in the authentication conditions and the authentication node designated in the authentication conditions.

4. The access management system according to claim 1, wherein
   in a mobile body node, which is any one of the plurality of nodes and is the passing body, the processing circuitry transmits, with a radio signal, the authentication information of the mobile body node, and
   the processing circuitry of the authentication node reads the authentication information transmitted by the mobile body node with the radio signal.

5. The access management system according to claim 4, wherein the processing circuitry of the management node records, in the blocks of the blockchain, the authentication conditions encrypted to be decryptable by the mobile body node, which is the passing body authenticatable in the authentication conditions, and the authentication node designated in the authentication conditions.

6. The access management system according to claim 1, wherein the management node is a management server that remotely controls movement of a mobile body which is the passing body.

7. The access management system according to claim 1, wherein the processing circuitry of each of the plurality of nodes
   determines a block generated by the processing circuitry of the node, which is not the authentication node, as invalid, and
   does not add the block determined as invalid to the blockchain.

8. The access management system according to claim 1, wherein the processing circuitry of the authentication node retrieves the authentication conditions recorded in the blocks generated from time retroactive by a preset time period to a present and performs the authentication based on the retrieved authentication conditions.

9. The access management system according to claim 1, wherein, when performing the authentication, the processing circuitry of the authentication node records, in the blocks of the blockchain, information concerning an authentication history including information for identifying the authentication node, information for identifying a target of the authentication, and information concerning time when the authentication is performed.

10. The access management system according to claim 1, wherein the authentication node is a door device including an electric lock that is unlocked or locked when the processing circuitry of the authentication node performs the authentication, the door device being provided on a route that a target of the authentication passes.

11. The access management system according to claim 1, wherein the authentication node is a control terminal that, when the processing circuitry of the authentication node performs the authentication, unlocks or locks an electric lock provided in a door device on a route that a target of the authentication passes.

12. The access management system according to claim 1, wherein the authentication node is an elevator including a car on which a target of the authentication by the processing circuitry of the authentication node rides, the elevator performing, when the authentication is performed, registration of a call for the car on which the target of the authentication rides.

13. The access management system according to claim 12, wherein the processing circuitry of the management node records, in the blocks of the blockchain, an attribute of the target of the authentication authenticatable in the authentication conditions, and
the authentication node performs the registration of the call of the target based on priority corresponding to the attribute of the target of the authentication.

14. The access management system according to claim 12, wherein the processing circuitry of the management node records, in the blocks of the blockchain, an attribute of the target of the authentication authenticatable in the authentication conditions, and
the authentication node includes a plurality of the cars and allocates a call of an authenticated target to any one of the cars based on an attribute of the target.

15. An authentication device for an access management system comprising:
processing circuitry
to store a blockchain shared among a plurality of nodes connected by a peer-to-peer (P2P) network;
to validate validity of a block added to the blockchain;
to read authentication information of a passing body; and
to authenticate the passing body when the authentication device is designated, in authentication conditions recorded in blocks of the blockchain by a management node, which is any one of the plurality of nodes, as an authentication node that performs authentication and the read authentication information is included in the authentication conditions as authentication information of an authenticatable passing body, wherein
the processing circuitry determines, when a hash value calculated from a block generated by any one of the plurality of nodes is equal to or larger than a set threshold, the block as invalid, and does not add the block determined as invalid to the blockchain, and
the processing circuitry sets a threshold set in validation of a block generated by the authentication node to a value larger than a threshold set in validation of a block generated by the node, which is not the authentication node, and validates validity of a block added to the blockchain.

16. A management device for an access management system comprising:
processing circuitry
to store a blockchain shared among a plurality of nodes connected by a peer-to-peer (P2P) network;
to validate validity of a block added to the blockchain; and
to record, in blocks of the blockchain, authentication conditions including authentication information of an authenticatable passing body and designating, as a node that reads the authentication information and performs authentication, an authentication node provided in a region where the passing body passes out of the plurality of nodes, wherein
the processing circuitry determines, when a hash value calculated from a block generated by any one of the plurality of nodes is equal to or larger than a set threshold, the block as invalid, and does not add the block determined as invalid to the blockchain, and
the processing circuitry sets a threshold set in validation of a block generated by the authentication node to a value larger than a threshold set in validation of a block generated by the node, which is not the authentication node, and validates validity of a block added to the blockchain.

17. A portable terminal or a mobile body for an access management system comprising:
processing circuitry
to store a blockchain shared among a plurality of nodes connected by a peer-to-peer (P2P) network;
to validate validity of a block added to the blockchain; and
to transmit, to an authentication node, with a radio signal, authentication information of either a passerby or the mobile body, which is an authenticatable target of authentication according to each the portable terminal or the mobile body, read from authentication conditions including the authentication information, designating, as a node that reads the authentication information and performs the authentication, the authentication node provided in a region where the target passes out of the plurality of nodes, and recorded in blocks of the blockchain by a management node, which is any one of the plurality of nodes, wherein
the processing circuitry determines, when a hash value calculated from a block generated by any one of the plurality of nodes is equal to or larger than a set threshold, the block as invalid, and does not add the block determined as invalid to the blockchain, and
the processing circuitry sets a threshold set in validation of a block generated by the authentication node to a value larger than a threshold set in validation of a block generated by the node, which is not the authentication node, and validates validity of a block added to the blockchain.

18. A non-transitory storage medium storing an access management program for causing an authentication device to execute:
storing a blockchain shared among a plurality of nodes connected by a peer-to-peer (P2P) network;
validating validity of a block added to the blockchain;
reading authentication information of a passing body; and
authenticating the passing body when the authentication device is designated, in authentication conditions recorded in blocks of the blockchain by a management node, which is any one of the plurality of nodes, as an authentication node that performs authentication and the read authentication information is included in the authentication conditions as authentication information of an authenticatable passing body, wherein
when a hash value calculated from a block generated by any one of the plurality of nodes is equal to or larger than a set threshold, the block is determined as invalid and the block determined as invalid is not added to the blockchain, and
a threshold set in validation of a block generated by the authentication node is set to a value larger than a threshold set in validation of a block generated by the node, which is not the authentication node.

19. A non-transitory storage medium storing an access management program for causing a management device to execute:
storing a blockchain shared among a plurality of nodes connected by a peer-to-peer (P2P) network;
validating validity of a block added to the blockchain; and
recording, in blocks of the blockchain, authentication conditions including authentication information of an authenticatable passing body and designating an authentication node provided in a region where the passing body passes out of the plurality of nodes as a node that reads the authentication information and performs authentication, wherein when a hash value calculated from a block generated by any one of the plurality of nodes is equal to or larger than a set threshold, the block is determined as invalid and the block determined as invalid is not added to the blockchain, and a threshold set in validation of a block generated by the authentication node is set to a value larger than a threshold set in validation of a block generated by the node, which is not the authentication node.

20. A non-transitory storage medium storing an access management program for causing either a portable terminal or a mobile body for an access management system to execute:

storing a blockchain shared among a plurality of nodes connected by a peer-to-peer (P2P) network;

validating validity of a block added to the blockchain; and transmitting, to an authentication node, with a radio signal, authentication information read from authentication conditions including the authentication information of either a passerby or the mobile body, which is an authenticable target of authentication according to each the portable terminal or the mobile body, designating the authentication node provided in a region where the target passes out of the plurality of nodes as a node that reads the authentication information and performs the authentication, and recorded in blocks of the blockchain by a management node, which is any one of the plurality of nodes, wherein when a hash value calculated from a block generated by any one of the plurality of nodes is equal to or larger than a set threshold, the block is determined as invalid and the block determined as invalid is not added to the blockchain, and a threshold set in validation of a block generated by the authentication node is set to a value larger than a threshold set in validation of a block generated by the node, which is not the authentication node.

21. A construction method for an access management system comprising:

distributing a first program to an authentication device provided in a region where a passing body passes and making the authentication device into an authentication node, which is any one of a plurality of nodes, the first program causing the authentication device to execute:

storing a blockchain shared among the plurality of nodes connected by a peer-to-peer (P2P) network;

validating validity of a block added to the blockchain;

reading authentication information of the passing body; and authenticating the passing body when the authentication device is designated, in authentication conditions recorded in blocks of the blockchain by a management node, which is any one of the plurality of nodes, as a node that performs authentication and the read authentication information is included in the authentication conditions as authentication information of an authenticatable passing body; and distributing a second program to a management device and making the management device into a management node, which is any one of the plurality of nodes, the second program causing the management device to execute:

storing the blockchain shared among the plurality of nodes;

validating validity of a block added to the blockchain; and recording the authentication conditions in the blocks of the blockchain, wherein when a hash value calculated from a block generated by any one of the plurality of nodes is equal to or larger than a set threshold, the block is determined as invalid and the block determined as invalid is not added to the blockchain, and a threshold set in validation of a block generated by the authentication node is set to a value larger than a threshold set in validation of a block generated by the node, which is not the authentication node.

\* \* \* \* \*